(12) United States Patent
Kim et al.

(10) Patent No.: US 10,582,194 B2
(45) Date of Patent: Mar. 3, 2020

(54) METHOD AND APPARATUS FOR ENCODING VIDEO AND METHOD AND APPARATUS FOR DECODING VIDEO BY CONSIDERING SKIP AND SPLIT ORDER

(71) Applicant: SAMSUNG ELECTRONICS CO., LTD., Suwon-si (KR)

(72) Inventors: Il-koo Kim, Osan-si (KR); Jung-hye Min, Suwon-si (KR); Hae-kyung Jung, Seoul (KR); Sun-il Lee, Yongin-si (KR); Min-su Cheon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/146,201

(22) Filed: Sep. 28, 2018

(65) Prior Publication Data

US 2019/0037212 A1 Jan. 31, 2019

Related U.S. Application Data

(63) Continuation of application No. 15/869,809, filed on Jan. 12, 2018, now Pat. No. 10,110,894, which is a (Continued)

(30) Foreign Application Priority Data

Jan. 14, 2010 (KR) .......................... 10-2010-0003555

(51) Int. Cl.
*H04N 19/103* (2014.01)
*H04N 19/105* (2014.01)
(Continued)

(52) U.S. Cl.
CPC ......... *H04N 19/103* (2014.11); *H04N 19/105* (2014.11); *H04N 19/119* (2014.11);
(Continued)

(58) Field of Classification Search
CPC .... H04N 19/597; H04N 19/132; H04N 19/96; H04N 19/61; H04N 19/122; H04N 19/46;
(Continued)

(56) References Cited

U.S. PATENT DOCUMENTS

| | | |
|---|---|---|
| 5,748,789 A | 5/1998 | Lee et al. |
| 5,832,234 A | 11/1998 | Iverson et al. |

(Continued)

FOREIGN PATENT DOCUMENTS

| | | | |
|---|---|---|---|
| CA | 2738037 A1 | 4/2010 | |
| CN | 1846437 A | 10/2006 | |

(Continued)

OTHER PUBLICATIONS

Communication dated Jul. 3, 2018, issued by the State Intellectual Property Office of P.R. China in counterpart Chinese Application No. 201510185676.7.

(Continued)

*Primary Examiner* — Neil R Mikeska
(74) *Attorney, Agent, or Firm* — Sughrue Mion, PLLC

(57) ABSTRACT

A method of encoding a video includes: splitting a picture into a maximum coding unit; for the maximum coding unit, determining coding units having a tree structure including coding units of coded depths and determining encoding modes for the coding units of the coded depths by performing encoding based on coding units according to depths, the coding units according to depths obtained by hierarchically splitting the maximum coding unit as a depth deepens; and outputting information about a maximum coding unit size and, for the maximum coding unit, information indicating an order of split information and skip mode information which is selectively determined for the coding units according to depths, information about the encoding modes for the coding units of the coded depths including the split information (Continued)

and the skip mode information which are arranged according to the order, and encoded video data.

3 Claims, 17 Drawing Sheets

Related U.S. Application Data continuation of application No. 14/948,705, filed on Nov. 23, 2015, now Pat. No. 9,894,356, which is a continuation of application No. 14/486,533, filed on Sep. 15, 2014, now Pat. No. 9,225,987, which is a continuation of application No. 13/005,920, filed on Jan. 13, 2011, now Pat. No. 8,855,201.

(51) Int. Cl.
| | |
|---|---|
| H04N 19/176 | (2014.01) |
| H04N 19/70 | (2014.01) |
| H04N 19/119 | (2014.01) |
| H04N 19/172 | (2014.01) |
| H04N 19/46 | (2014.01) |
| H04N 19/122 | (2014.01) |
| H04N 19/61 | (2014.01) |
| H04N 19/96 | (2014.01) |
| H04N 19/132 | (2014.01) |
| H04N 19/196 | (2014.01) |
| H04N 19/597 | (2014.01) |

(52) U.S. Cl.
CPC ......... *H04N 19/122* (2014.11); *H04N 19/132* (2014.11); *H04N 19/172* (2014.11); *H04N 19/176* (2014.11); *H04N 19/198* (2014.11); *H04N 19/46* (2014.11); *H04N 19/597* (2014.11); *H04N 19/61* (2014.11); *H04N 19/70* (2014.11); *H04N 19/96* (2014.11)

(58) Field of Classification Search
CPC .... H04N 19/103; H04N 19/119; H04N 19/70; H04N 19/176; H04N 19/105; H04N 19/198; H04N 19/172
See application file for complete search history.

(56) References Cited

U.S. PATENT DOCUMENTS

| | | | |
|---|---|---|---|
| 8,363,936 B2 | 1/2013 | Divorra Escoda et al. | |
| 8,374,241 B2 | 2/2013 | Chen et al. | |
| 8,687,709 B2 | 4/2014 | Hsu et al. | |
| 8,780,993 B2 | 7/2014 | Lee et al. | |
| 9,313,489 B2 | 4/2016 | Chen et al. | |
| 9,374,579 B2 | 6/2016 | Chen et al. | |
| 9,445,101 B2 | 9/2016 | Song | |
| 2003/0012287 A1 | 1/2003 | Katsavounidis et al. | |
| 2003/0068089 A1 | 4/2003 | Sano et al. | |
| 2003/0112870 A1 | 6/2003 | Fukuda et al. | |
| 2004/0165765 A1 | 8/2004 | Sung et al. | |
| 2005/0114093 A1 | 5/2005 | Cha et al. | |
| 2006/0104359 A1 | 5/2006 | Zhou et al. | |
| 2006/0153297 A1 | 7/2006 | Boyce | |
| 2006/0203911 A1 | 9/2006 | Zhou et al. | |
| 2006/0251330 A1 | 11/2006 | Toth et al. | |
| 2007/0058718 A1 | 3/2007 | Shen et al. | |
| 2008/0049834 A1 | 2/2008 | Holcomb et al. | |
| 2008/0095241 A1 | 4/2008 | Amon | |
| 2008/0101707 A1 | 5/2008 | Mukherjee et al. | |
| 2008/0165861 A1* | 7/2008 | Wen ................. | H04N 19/139 375/240.26 |
| 2008/0239335 A1 | 10/2008 | Lee et al. | |
| 2008/0240246 A1 | 10/2008 | Lee et al. | |
| 2008/0240248 A1* | 10/2008 | Lee ................. | H04N 19/52 375/240.16 |
| 2008/0291724 A1 | 11/2008 | Litsyn et al. | |
| 2009/0041121 A1* | 2/2009 | Chen ................. | H04N 19/105 375/240.12 |
| 2009/0092326 A1 | 4/2009 | Fukuhara et al. | |
| 2009/0196350 A1 | 8/2009 | Xiong | |
| 2009/0196517 A1 | 8/2009 | Divorra Escoda | |
| 2009/0213940 A1* | 8/2009 | Steinbach ............ | H04N 19/176 375/240.27 |
| 2009/0219994 A1 | 9/2009 | Tu et al. | |
| 2009/0245376 A1 | 10/2009 | Choi et al. | |
| 2009/0273706 A1 | 11/2009 | Tu | |
| 2010/0086029 A1 | 4/2010 | Chen et al. | |
| 2010/0086030 A1 | 4/2010 | Chen et al. | |
| 2010/0086031 A1 | 4/2010 | Chen et al. | |
| 2010/0086032 A1 | 4/2010 | Chen et al. | |
| 2010/0208989 A1 | 8/2010 | Narroschke et al. | |
| 2011/0002554 A1 | 1/2011 | Uslubas et al. | |
| 2011/0170012 A1 | 7/2011 | Cheon et al. | |
| 2011/0170593 A1 | 7/2011 | Kim et al. | |
| 2012/0177106 A1 | 7/2012 | Divorra Escoda et al. | |
| 2012/0177107 A1 | 7/2012 | Fu et al. | |
| 2012/0177116 A1 | 7/2012 | Panusopone et al. | |
| 2013/0003855 A1 | 1/2013 | Park et al. | |
| 2014/0146880 A1 | 5/2014 | Jung et al. | |
| 2014/0205003 A1 | 7/2014 | Han et al. | |
| 2014/0294084 A1 | 10/2014 | Cheon | |
| 2015/0016525 A1 | 1/2015 | Alshina et al. | |
| 2015/0146796 A1 | 5/2015 | Chen et al. | |
| 2015/0326854 A1 | 11/2015 | Jung et al. | |

FOREIGN PATENT DOCUMENTS

| | | |
|---|---|---|
| CN | 101159873 A | 4/2008 |
| CN | 101222641 A | 7/2008 |
| CN | 101507280 A | 8/2009 |
| CN | 1857001 B | 12/2011 |
| CN | 102474612 A | 5/2012 |
| CN | 104469363 A | 3/2015 |
| EP | 1950973 A1 | 7/2008 |
| EP | 2106146 A2 | 9/2009 |
| JP | 2010-135864 A | 6/2010 |
| JP | 2013-502145 A | 1/2013 |
| JP | 2013-509080 A | 3/2013 |
| JP | 2013-509788 A | 3/2013 |
| JP | 2013-513330 A | 4/2013 |
| KR | 10-2005-0045746 A | 5/2005 |
| KR | 10-2006-0027795 A | 3/2006 |
| KR | 10-0842558 B1 | 6/2008 |
| KR | 10-2011-0017719 A | 2/2011 |
| RU | 2 330 325 C2 | 7/2008 |
| RU | 2341035 C1 | 12/2008 |
| RU | 2375838 C1 | 12/2009 |
| WO | 97/09828 A1 | 3/1997 |
| WO | 2004/032032 A1 | 4/2004 |
| WO | 2008027192 A2 | 3/2008 |
| WO | 2009051719 A2 | 4/2009 |
| WO | 2009/130561 A1 | 10/2009 |
| WO | 2009/151232 A2 | 12/2009 |
| WO | 2010002214 A2 | 1/2010 |
| WO | 2010/039731 A2 | 4/2010 |
| WO | 2010-039733 A2 | 4/2010 |
| WO | 2010039729 A2 | 4/2010 |
| WO | 2011019250 A2 | 2/2011 |

OTHER PUBLICATIONS

Communication dated Aug. 16, 2018, issued by the State Intellectual Property Office of P.R. China in counterpart Chinese Application No. 201510184942.4.

Communication issued by the Federal Service on Intellectual Property dated Aug. 31, 2017 in counterpart Russian Patent Application No. 2014113051.

Kim, et al., "Enlarging MB size for high fidelity video coding beyond HD", Oct. 2008, ITU-Telecommunications Standardization Sector Video Coding Experts Group (VCEG), VCEG-AJ21, pp. 1-8.

Communication dated May 18, 2017, issued by the State Intellectual Property Office of the People's Republic of China in counterpart

(56) References Cited

OTHER PUBLICATIONS

Chinese Patent Application No. 201510185679.0.
Communication dated Jun. 2, 2017, issued by the State Intellectual Property Office of the People's Republic of China in counterpart Chinese Patent Application No. 201510185151.3.
Communication dated Jun. 13, 2017, issued by the State Intellectual Property Office of the People's Republic of China in counterpart Chinese Patent Application No. 201510185676.7.
Communication dated Jun. 16, 2017, issued by the State Intellectual Property Office of the People's Republic of China in counterpart Chinese Patent Application No. 201510184941.X.
Communication dated Jun. 26, 2017, issued by the State Intellectual Property Office of the People's Republic of China in counterpart Chinese Patent Application No. 201510184942.4.
Communication dated Oct. 28, 2016 issued by Korean Intellectual Property Office in counterpart Korean Application No. 10-2015-0034045.
Communication dated Oct. 28, 2016 issued by Korean Intellectual Property Office in counterpart Korean Application No. 10-2010-0003555.
Communication dated Apr. 29, 2016, issued by the Korean Intellectual Property Office in counterpart Korean Application No. 10-2015-0034045.
Communication dated Jun. 10, 2016, issued by the Australian Patent Office in counterpart Australian Application No. 2015203385.
Communication dated Jun. 10, 2016, issued by the Australian Patent Office in counterpart Australian Application No. 2015203383.
Communication dated Jun. 15, 2016, issued by the Australian Patent Office in counterpart Australian Application No. 2015203386.
Communication dated Jun. 15, 2016, issued by the Australian Patent Office in counterpart Australian Application No. 2015203387.
Communication dated Oct. 13, 2015 issued by the Japanese Patent Office in counterpart Japanese Patent Application No. 2015-009754.
Communication dated Mar. 25, 2015 by the Australian Intellectual Property Office in related Application No. 2011205940.
Communication dated Apr. 22, 2015 by the European Patent Office in related Application No. 11733079.5.
McCann et al., "Samsung's Response to the Call for Proposals on Video Compression Technology", Joint Collaborative Team on Video Coding (JCT-VC) of ITU-T SG16 and ISO/IEC JTC1/SC29/WG11, 1st Meeting: Dresden, DE, Apr. 12-23, 2010, total 40 pages.
Han et al., "Improved Video Compression Efficiency Through Flexible Unit Representation and Corresponding Extenstion of Coding Tools", IEEE Transactions on Circuits and Systems Center, vol. 20, No. 12, Dec. 2010, total 12 pages.
Naito et al., "Efficient coding scheme for super high definition video based on exteding H.264 high profile", Proceedings of SPIE-IS&T Electronic Imaging, vol. 6077, No. 67727, Jan. 18, 2006, total 8 pages.
Wu et al., "Fast Intermode Decision in H.264/AVC Video Coding", IEEE Transactions of Circuits and Systems for Video Technology, vol. 15, No. 7, Jul. 1, 2005, total 6 pages.
Puri et al., "Video coding using the H.264/MPEF-4 AVC compression standard", Signal Processing Image Communication, vol. 19, No. 9, Oct. 2004, total 57 pages.
Strobach, "Tree-Structured Scene Adaptive Coder", IEEE Transactions on Communications, vol. 38, No. 4, Apr. 1, 1990, total 10 pages.
Communication dated Oct. 21, 2014 issued by the Japanese Patent Office in counterpart Japanese Application No. 2012-548887.
Communication dated Oct. 23, 2014 issued by the State Intellectual Property Office of Australia in counterpart Australian Application No. 2011205940.
Communication dated Nov. 25, 2014 issued by the State Intellectual Property Office of P.R. China in counterpart Chinese Application No. 201180013973.3.
International Search Report, dated Sep. 15, 2011, issued in Application No. PCT/KR2011/00239.
Communication dated Oct. 9, 2013, issued by the Australian Patent Office in counterpart Australian Application No. 2011205940.
Communication, dated Mar. 10, 2014, issued by the Indonesian Patent Office in counterpart Indonesian Application No. W-00201203296.
Communication, dated May 1, 2014, issued by the Canadian Patent Office in counterpart Canadian Application No. 2,786,989.
Communication from the Russian Patent Office dated Dec. 11, 2013 in a counterpart Russian application No. 2012134633.
Communication dated Jun. 18, 2019 issued by the Japanese Patent Office in counterpart Japanese Application No. 2018-94415.
Communication dated Dec. 5, 2018, issued by the State Intellectual Property Office of the People's Republic of China in counterpart Chinese Patent Application No. 201510185676.7.
Communication dated Sep. 20, 2018, from the State Intellectual Property Office of People's Republic of China in counterpart Application No. 201510185151.3.
Communication dated Nov. 12, 2018, from the Russian Patent Office in counterpart application No. 2017142783/08.

* cited by examiner

FIG. 7
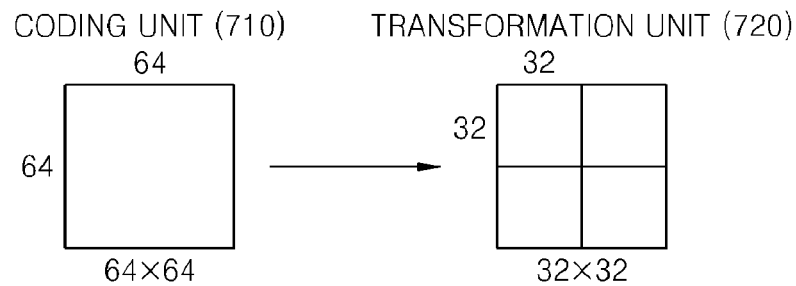
FIG. 8
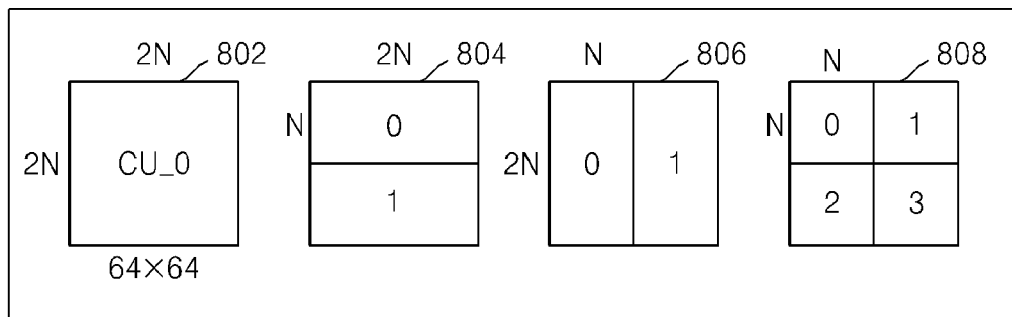
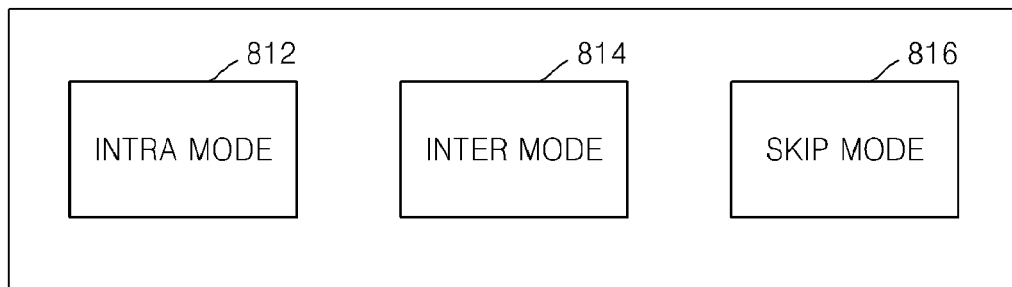
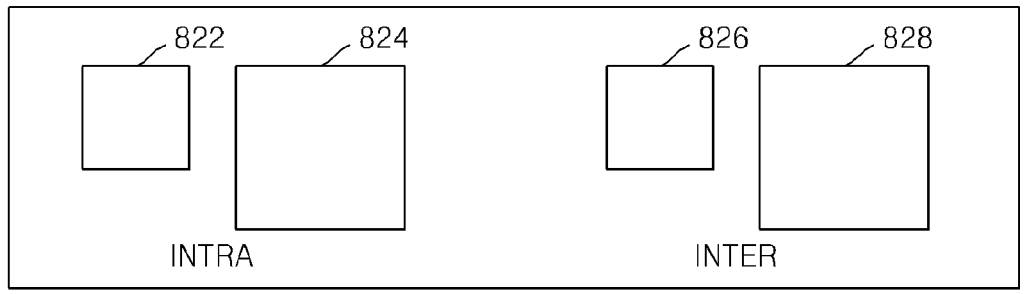

CODING UNITS (1010)

METHOD AND APPARATUS FOR ENCODING VIDEO AND METHOD AND APPARATUS FOR DECODING VIDEO BY CONSIDERING SKIP AND SPLIT ORDER

CROSS-REFERENCE TO RELATED PATENT APPLICATIONS

This is a continuation of U.S. application Ser. No. 15/869,809, filed Jan. 12, 2018, which is a continuation of U.S. application Ser. No. 14/948,705, filed Nov. 23, 2015, now U.S. Pat. No. 9,894,356 issued on Feb. 13, 2018, which is a continuation of U.S. application Ser. No. 14/486,533, filed Sep. 15, 2014, now U.S. Pat. No. 9,225,987 issued on Dec. 29, 2015, which is a continuation of U.S. application Ser. No. 13/005,920, filed Jan. 13, 2011, now U.S. Pat. No. 8,855,201 issued on Oct. 7, 2014, which claims priority from Korean Patent Application No. 10-2010-0003555, filed on Jan. 14, 2010 in the Korean Intellectual Property Office, the disclosures of which are incorporated herein in their entireties by reference.

BACKGROUND

1. Field

Apparatuses and methods consistent with exemplary embodiments relate to encoding and decoding a video.

2. Description of the Related Art

As hardware for reproducing and storing high resolution or high quality video content is being developed and supplied, a need for a video codec for effectively encoding or decoding the high resolution or high quality video content is increasing. In a related art video codec, a video is encoded according to a limited encoding method based on a macroblock having a predetermined size.

SUMMARY

Exemplary embodiments provide encoding and decoding of a video by considering a skip and split order of a coding unit according to characteristics of a data unit.

According to an aspect of an exemplary embodiment, there is provided a method of encoding a video by considering a skip and split order, the method including: splitting a picture into a maximum coding unit including coding units being data units in which the picture is encoded; for the maximum coding unit, determining coding units having a tree structure including coding units of coded depths and determining encoding modes for the coding units of coded depths by performing encoding based on coding units according to depths, the coding units according to depths obtained by hierarchically splitting the maximum coding unit as a depth deepens and the depths being proportional to a number of times the maximum coding unit is split; and outputting information about a maximum coding unit size and, for the maximum coding unit, information indicating an order of split information and skip mode information which is selectively determined for the coding units according to depths, information about the encoding modes for the coding units of the coded depths including the split information and the skip mode information which are arranged according to the order, and encoded video data.

A coding unit may be characterized by a maximum size and a depth. The depth denotes the number of times a coding unit is hierarchically split, and as the depth deepens, deeper coding units according to depths may be split from a maximum coding unit to a minimum coding unit. A depth of the maximum coding unit may be an uppermost depth, and a depth of the minimum coding unit may be a lowermost depth. Since sizes of coding units according to depths decrease as the depth of the maximum coding unit deepens, a coding unit of an upper depth may include a plurality of coding units of lower depths.

According to a maximum size of a coding unit, image data of a current picture may be split into maximum coding units, and each of the maximum coding units may include coding units split according to depths. Since a maximum coding unit is split according to depths, image data of a spatial domain included in the maximum coding unit may be hierarchically classified according to depths.

A maximum depth and a maximum size of a coding unit, which limit a total number of times a height and a width of the maximum coding unit are hierarchically split, may be predetermined.

The order of the split information and the skip mode information which is selectively determined for the coding units according to depths may be determined by at least one of an image sequence to which the coding units according to depths belong, a slice, a slice type according to a prediction direction, and a quantization parameter of a data unit.

The order of the split information and the skip mode information which is selectively determined for the coding units according to depths may be determined by the depths of the coding units in the maximum coding unit.

The order of the split information and the skip mode information of the coding units according to depths may be determined in such a manner that if a coding unit is the maximum coding unit, the skip mode information precedes the split information, and if the coding unit is not the maximum coding unit, the split information precedes the skip mode information.

According to an aspect of another exemplary embodiment, there is provided a method of decoding a video by considering a skip and split order, the method including: receiving and parsing a bitstream of encoded video data; extracting, from the bitstream, information about a maximum size of a coding unit being a data unit in which a picture is decoded, information about an order of split information and skip mode information about coding units according to depths, and, according to the order of the split information and the skip mode information, information about a coded depth and an encoding mode and encoded video data according to a maximum coding unit of the picture; and based on the extracted information about the maximum size of the coding unit and the information about the coded depth and the encoding mode, decoding the encoded video data of the picture according to coding units having a tree structure including coding units of coded depths.

The extracting may include: if a coding unit is the maximum coding unit, according to the order of the split information and the skip mode information, determining whether the maximum coding unit is predicted in a skip mode according to the skip mode information before determining whether the maximum coding unit is split according to the split information; if the coding unit is not the maximum coding unit, determining whether the coding unit is split according to the split information before determining whether the coding unit is predicted in a skip mode according to the skip mode information; and extracting the information about the coded depth and the encoding mode of the coded depth and the encoded video data according to coding units of the coded depth.

In the extracting, if one piece of split and skip information obtained by combining the split information and the skip mode information for coding unit according to depths is extracted, the coding units according to depths may be predicted in a skip mode without being split, and if the split information or the skip mode information for the coding units according to depths is extracted, the coding units according to depths may not be split or may not be predicted in a skip mode.

According to an aspect of another exemplary embodiment, there is provided an apparatus for encoding a video by considering a skip and split order, the apparatus including: a maximum coding unit splitter which splits a picture into a maximum coding unit, including coding units being data units in which the picture is encoded; a coding unit and encoding mode determiner which, for the maximum coding unit, determines coding units having a tree structure including coding units of coded depths and determines encoding modes for the coding units of the coded depths by performing encoding based on the coding units according to depths, the coding units according to depths obtained by hierarchically splitting the maximum coding unit as a depth deepens; and an output unit which outputs information about a maximum coding unit size and, for the maximum coding unit, information indicating an order of split information and skip mode information which is selectively determined for the coding units according to depths, information about the encoding modes of the coding units of the coded depths including the split information and the skip mode information which are arranged according to the order, and encoded video data.

According to an aspect of another exemplary embodiment, there is provided an apparatus for decoding a video by considering a skip and split order, the apparatus including: a receiver which receives and parses a bitstream of encoded video data; a data extractor which extracts, from the bitstream, information about a maximum size of a coding unit being a data unit in which a picture is decoded, information about an order of split information and skip mode information of coding units according to depths, and, according to the order of the split information and the skip mode information, information about a coded depth and an encoding mode according to a maximum coding unit of the picture; and a decoder which, based on the information about the maximum size of the coding unit and the information about the coded depth and the encoding mode, decodes the encoded video data of the picture according to coding units having a tree structure including coding units of coded depths.

According to an aspect of another exemplary embodiment, there is provided a computer-readable recording medium having embodied thereon a program for executing the encoding method. Also, according to an aspect of another exemplary embodiment, there is provided a computer-readable recording medium having embodied thereon a program for executing the decoding method.

BRIEF DESCRIPTION OF THE DRAWINGS

The above and other aspects will become more apparent by describing in detail exemplary embodiments with reference to the attached drawings in which:

FIG. 7 is a diagram for describing a relationship between a coding unit and transformation units, according to an exemplary embodiment;

FIG. 8 is a diagram for describing encoding information of coding units corresponding to a coded depth, according to an exemplary embodiment;

DETAILED DESCRIPTION OF EXEMPLARY EMBODIMENTS

An apparatus for encoding a video, an apparatus for decoding a video, a method of encoding a video, and a method of decoding a video according to exemplary embodiments will be explained with reference to FIGS. 1 through 23. Encoding and decoding of a video based on a spatially hierarchical data unit according to one or more exemplary embodiments will be explained with reference to FIGS. 1 through 15, and encoding and decoding of a video considering an order of skip and split according to one or more exemplary embodiments will be explained with reference to FIGS. 16 through 23.

Exemplary embodiments will now be described more fully with reference to the accompanying drawings.

Hereinafter, a 'coding unit' is an encoding data unit in which the image data is encoded at an encoder side, for example an encoding apparatus including a processor and an encoder, and an encoded data unit in which the encoded image data is decoded at a decoder side, for example a decoding apparatus including a processor and a decoder, according to the exemplary embodiments.

Hereinafter, an 'image' may denote a still image for a video or a moving image, that is, the video itself.

An apparatus for encoding a video, an apparatus for decoding a video, a method of encoding a video, and a method of decoding a video according to exemplary embodiments will be explained with reference to FIGS. 1 through 15.

Figure 1:
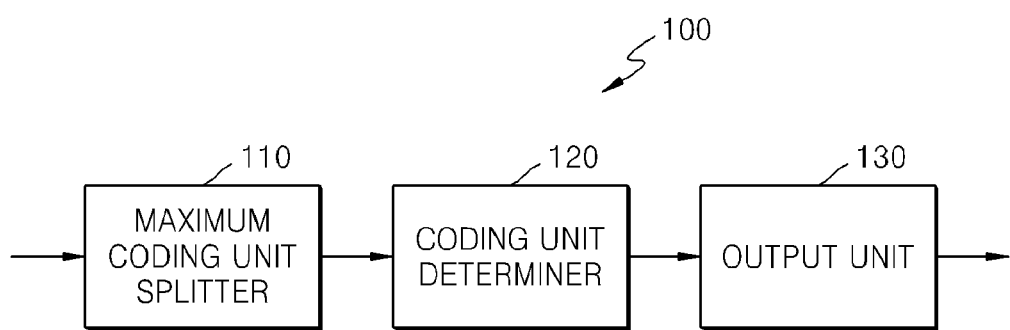
FIG. 1 is a block diagram of an apparatus for encoding a video, according to an exemplary embodiment.

FIG. 1 is a block diagram of an apparatus 100 for encoding a video, according to an exemplary embodiment.

The apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens or increases, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth are finally output. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units corresponding to same depth in one maximum coding unit, each of the coding units corresponding to the same depth may be split to a lower depth by measuring an encoding error of the image data of the each coding unit, separately. Accordingly, even when image data is included in one maximum coding unit, the image data is split to regions according to the depths, the encoding errors may differ according to regions in the one maximum coding unite, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The apparatus 100 may variably select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into $4^1$ transformation units, and the size of the transformation unit is thus N×N, and may be 2 when each of the height and width of the current coding unit is split into four equal parts, totally split into $4^2$ transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Similarly to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth requires not only information about the coded depth, but also information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into SPS (Sequence Parameter Set) or a header of a bitstream.

In the apparatus 100, the deeper coding unit may be a coding unit obtained by dividing a height or width of a coding unit of an upper depth by two. In other words, when the size of the coding unit of the current depth is 2N×2N, the size of the coding unit of the lower depth is N×N. Also, the coding unit of the current depth having the size of 2N×2N may include maximum 4 of the coding unit of the lower depth.

Accordingly, the apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the apparatus 100, image compression efficiency may be increased since a coding unit is adjusted while considering characteristics of an image while increasing a maximum size of a coding unit while considering a size of the image.

Figure 2:
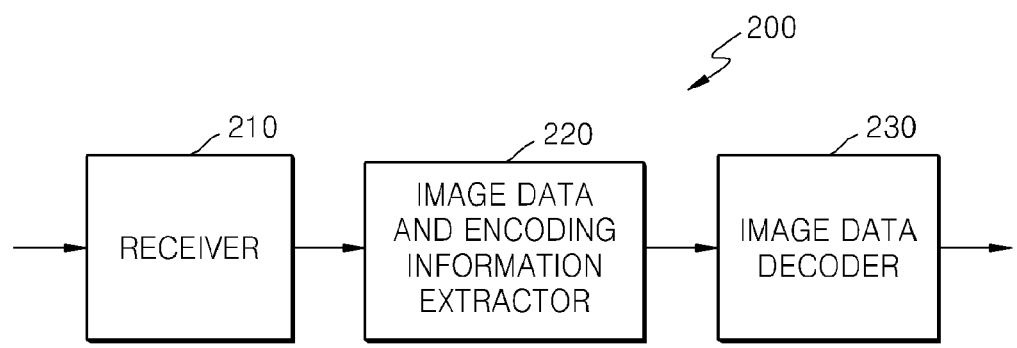
FIG. 2 is a block diagram of an apparatus for decoding a video, according to an exemplary embodiment.

FIG. 2 is a block diagram of an apparatus 200 for decoding a video, according to an exemplary embodiment.

The apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the apparatus 200 are identical to those described with reference to FIG. 1 and the apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the apparatus 100, repeatedly performs encoding for each deeper coding unit according to depths according to each maximum coding unit. Accordingly, the apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and a inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and a amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
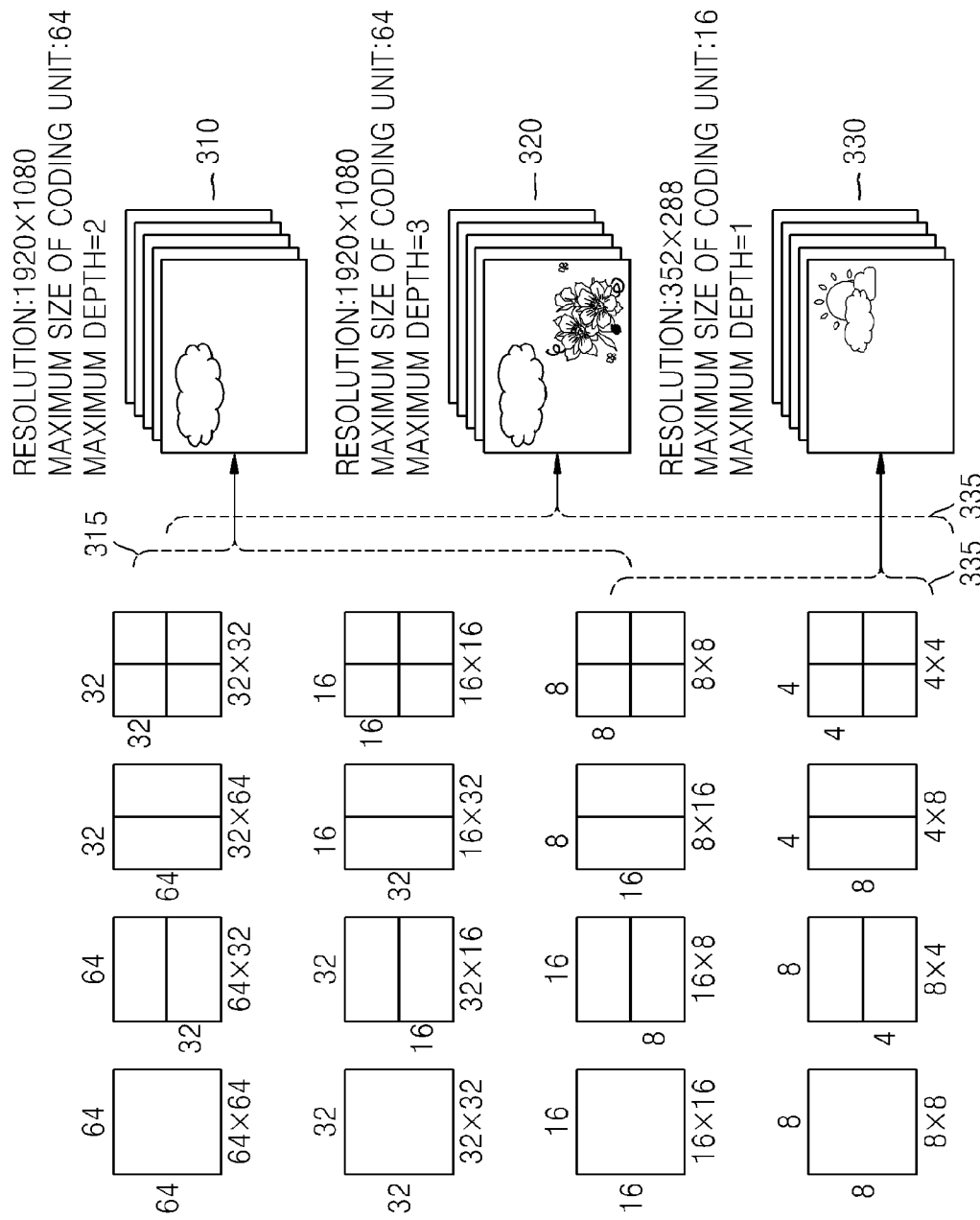
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
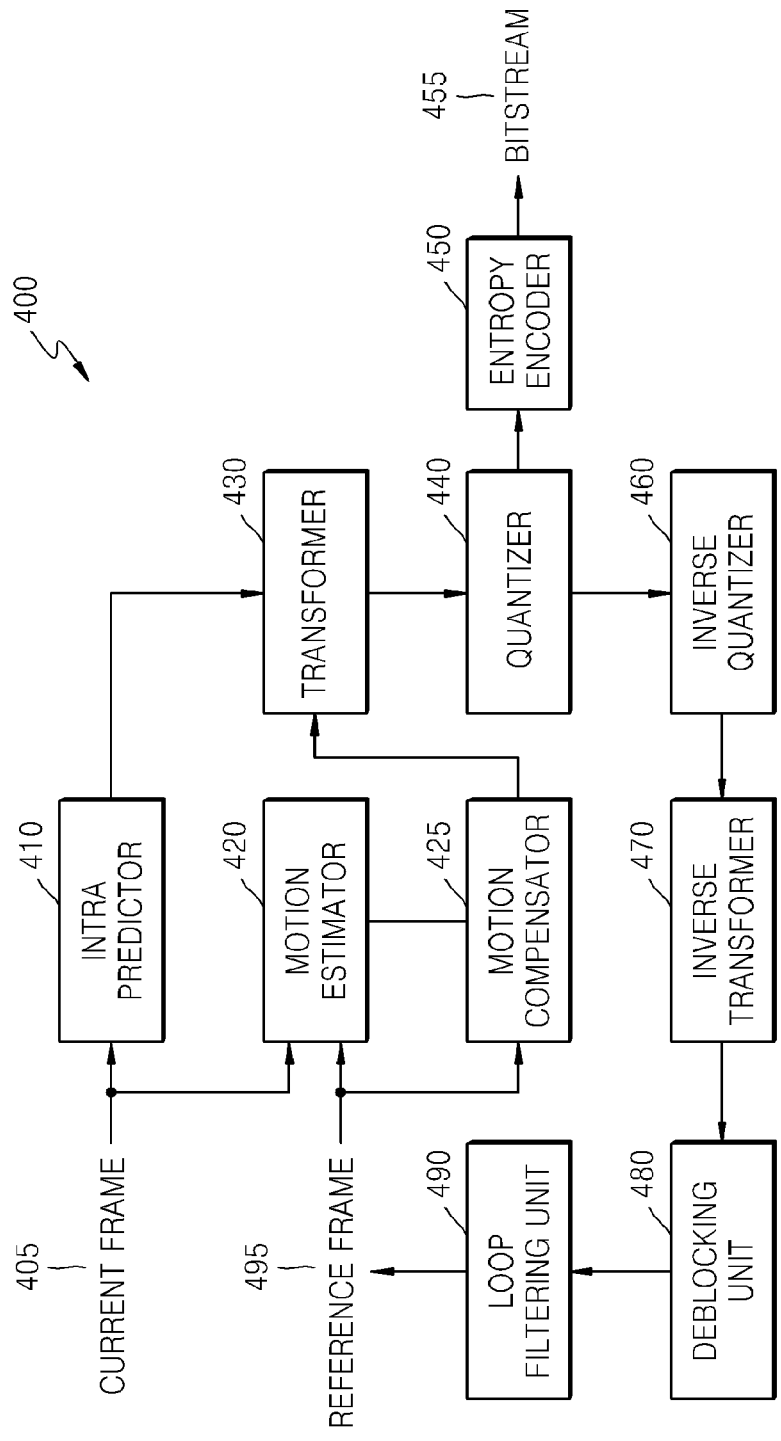
FIG. 4 is a block diagram of an image encoder based on coding units according to an exemplary embodiment.

FIG. 4 is a block diagram of an image encoder 400 based on coding units, according to an exemplary embodiment.

The image encoder 400 performs operations of the coding unit determiner 120 of the apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
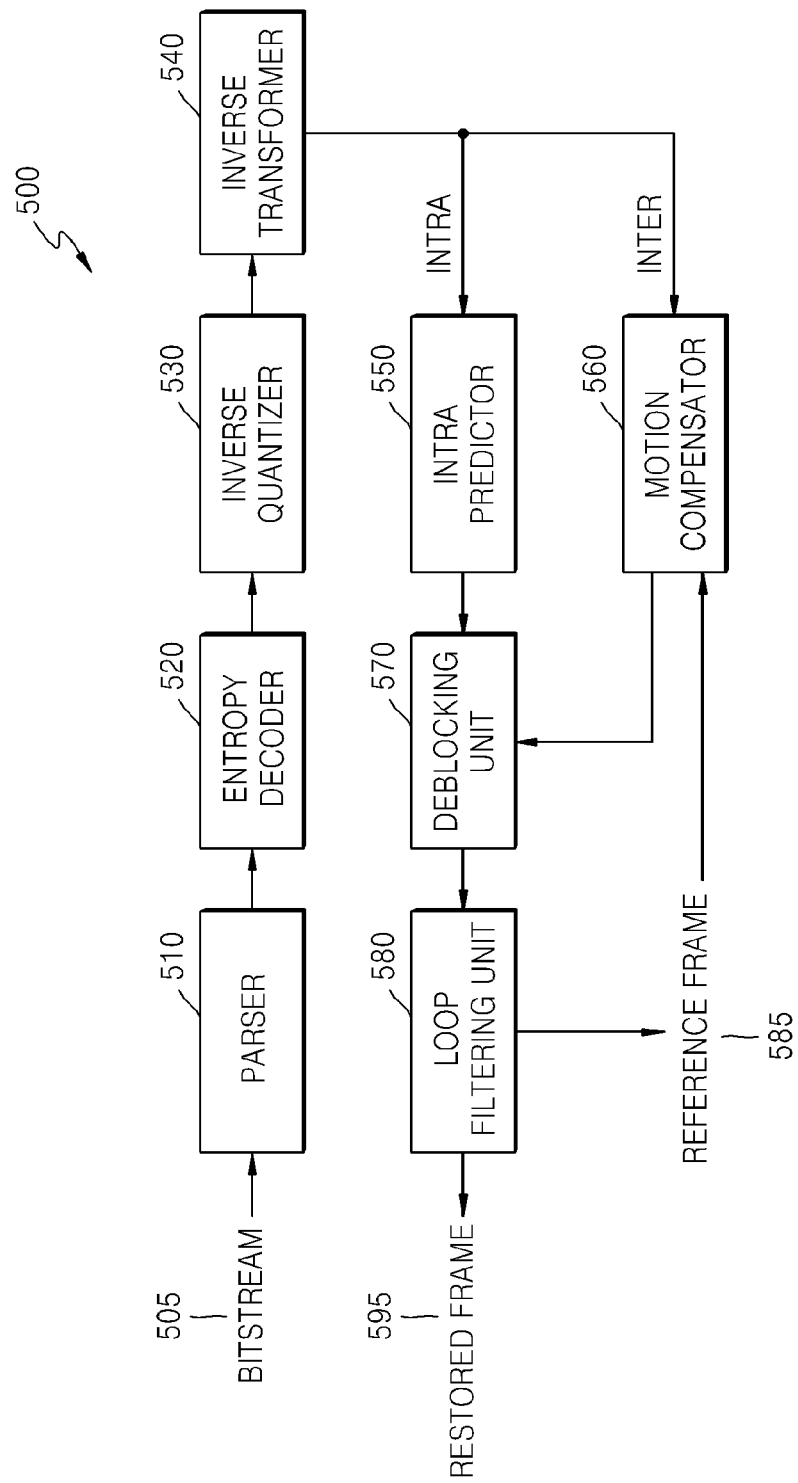
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the apparatus 200, the image decoder 500 may perform operations that are performed after the parser 510.

In order for the image decoder 500 to be applied in the apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 perform operations based on a size of a transformation unit for each coding unit.

Figure 6:
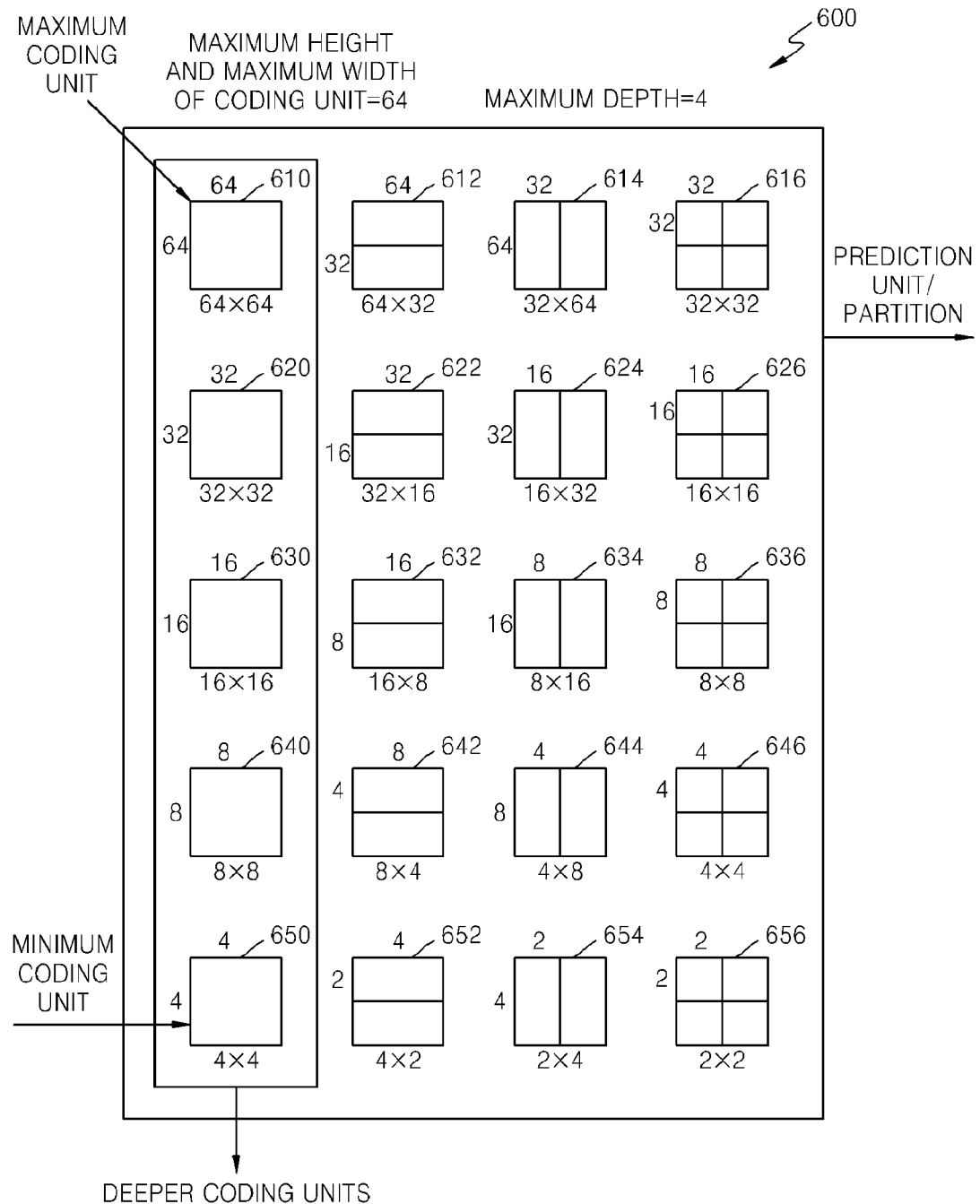
FIG. 6 is a diagram illustrating deeper coding units according to depths, and a prediction unit according to an exemplary embodiment.

FIG. 6 is a diagram illustrating deeper coding units according to depths, and partitions, according to an exemplary embodiment.

The apparatus 100 and the apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the coding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e., a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4, as opposed to being partitioned into partitions 652 having a size of 4×2, partitions 654 having a size of 2×4, and partitions 656 having a size of 2×2.

In order to determine the at least one coded depth of the coding units constituting the maximum coding unit 610, the coding unit determiner 120 of the apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depth, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

FIG. 7 is a diagram for describing a relationship between a coding unit 710 and transformation units 720, according to an exemplary embodiment.

The apparatus 100 or 200 encodes or decodes an image according to coding units having sizes smaller than or equal to a maximum coding unit for each maximum coding unit. Sizes of transformation units for transformation during encoding may be selected based on data units that are not larger than corresponding coding unit.

For example, in the apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

FIG. 8 is a diagram for describing encoding information of coding units corresponding to a coded depth, according to an exemplary embodiment.

The output unit 130 of the apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 220 of the apparatus 200 may extract and use the information 800, 810, and 820 for decoding.

Figure 9:
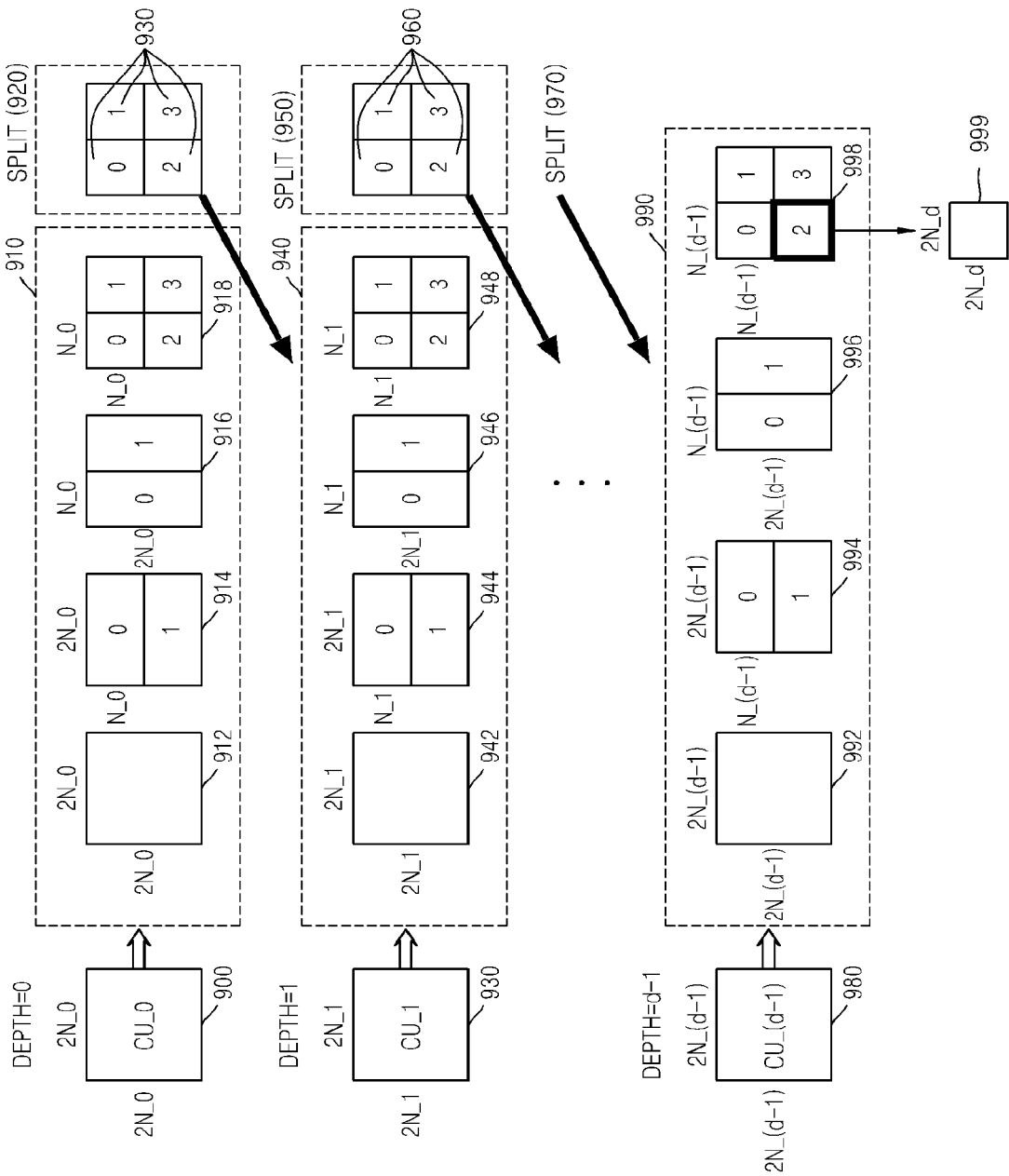
FIG. 9 is a diagram of deeper coding units according to depths, according to an exemplary embodiment.

FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the coding unit 900 may be determined to be N_(d−1)×N_(d−1). Also, since the maximum depth is d and a minimum coding unit 980 having a lowermost depth of d−1 is no longer split to a lower depth, split information for a coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the apparatus 200 may extract and use the information about the coded depth and the prediction unit of the coding unit 900 to decode the partition 912. The apparatus 200 may determine a depth, in which split information is 0, as a coded depth by using split information according to depths, and use information about an encoding mode of the corresponding depth for decoding.

Figure 10:
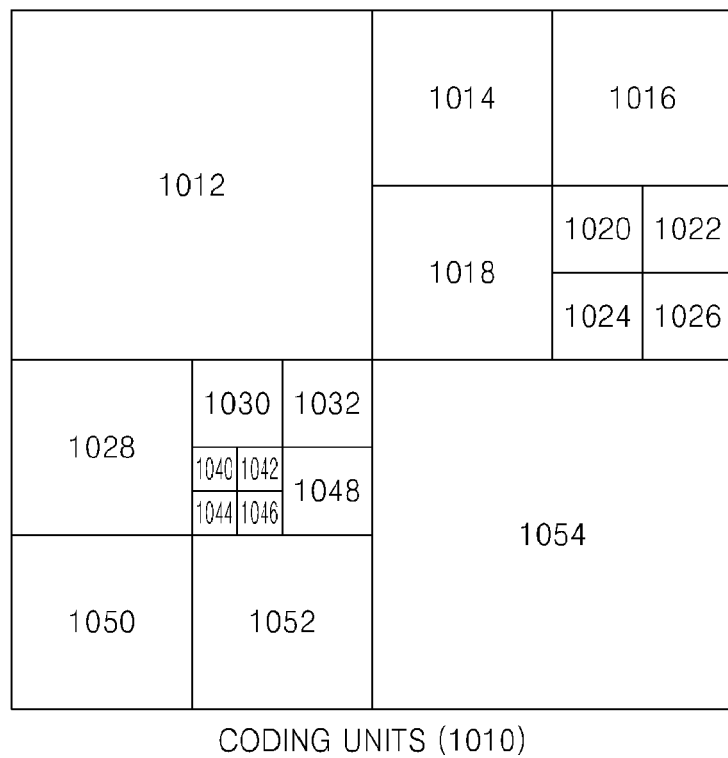
FIGS. 10 through 12 are diagrams for describing a relationship between coding units, prediction units, and transformation units, according to an exemplary embodiment.
Figure 11:
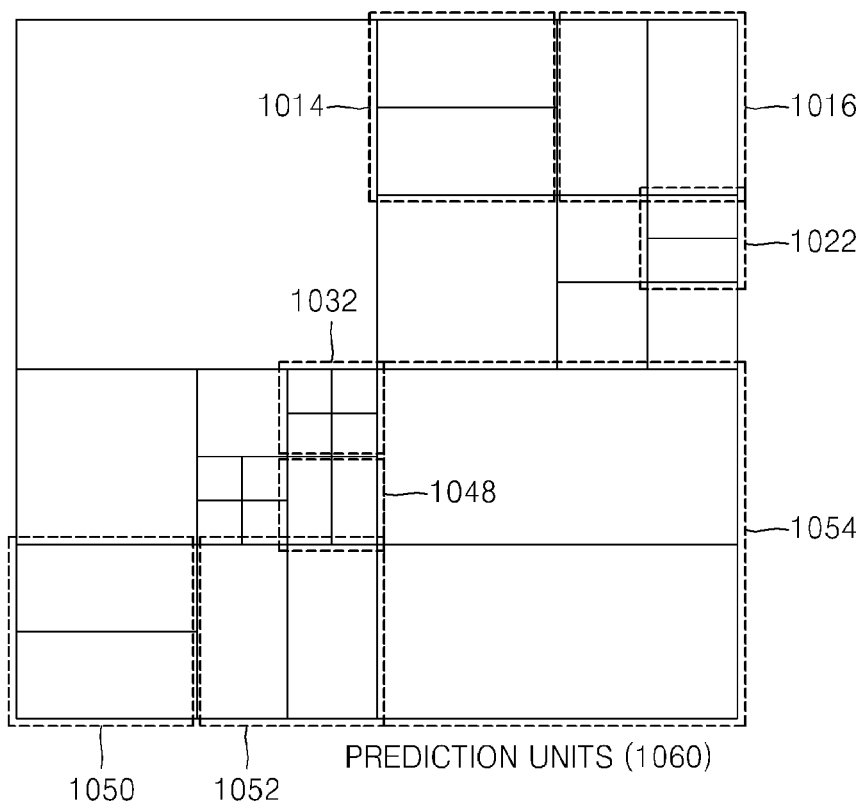
Figure 12:
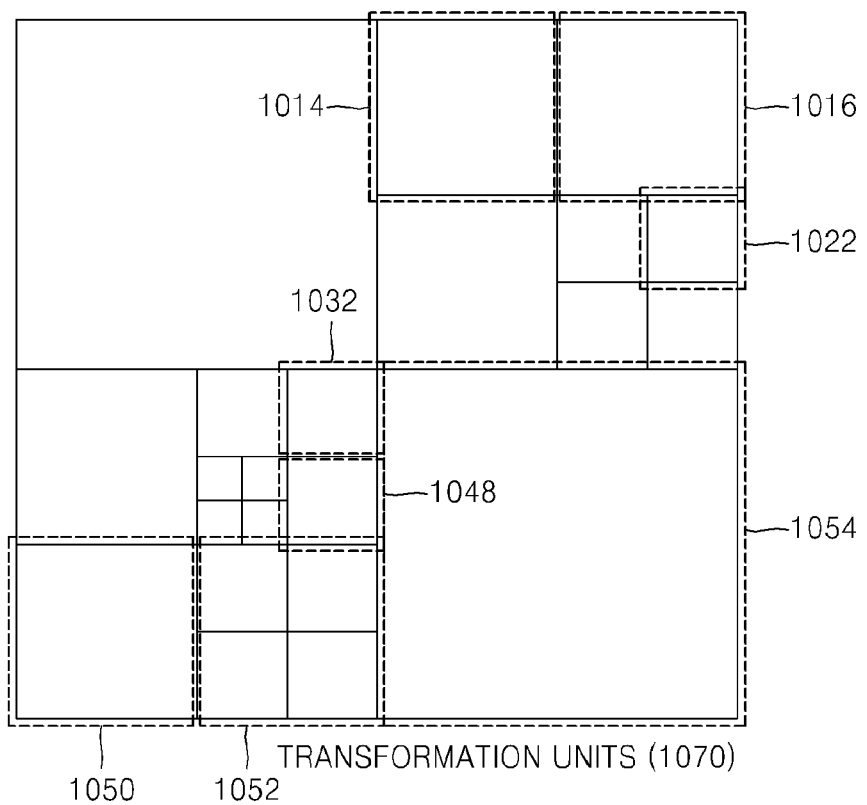

FIGS. 10 through 12 are diagrams for describing a relationship between coding units 1010, prediction units 1060, and transformation units 1070, according to an exemplary embodiment.

The coding units 1010 are coding units having a tree structure, corresponding to coded depths determined by the apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some coding units 1014, 1016, 1022, 1032, 1048, 1050, 1052, and 1054 are split into partitions for prediction encoding. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the apparatuses 100 and 200.

TABLE 1

| | Split Information 0 (Encoding on Coding unit having Size of 2N × 2N and Current Depth of d) | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the apparatus 100 may output the encoding information about the coding units having a tree structure, and the image data and encoding information extractor 220 of the apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 13:
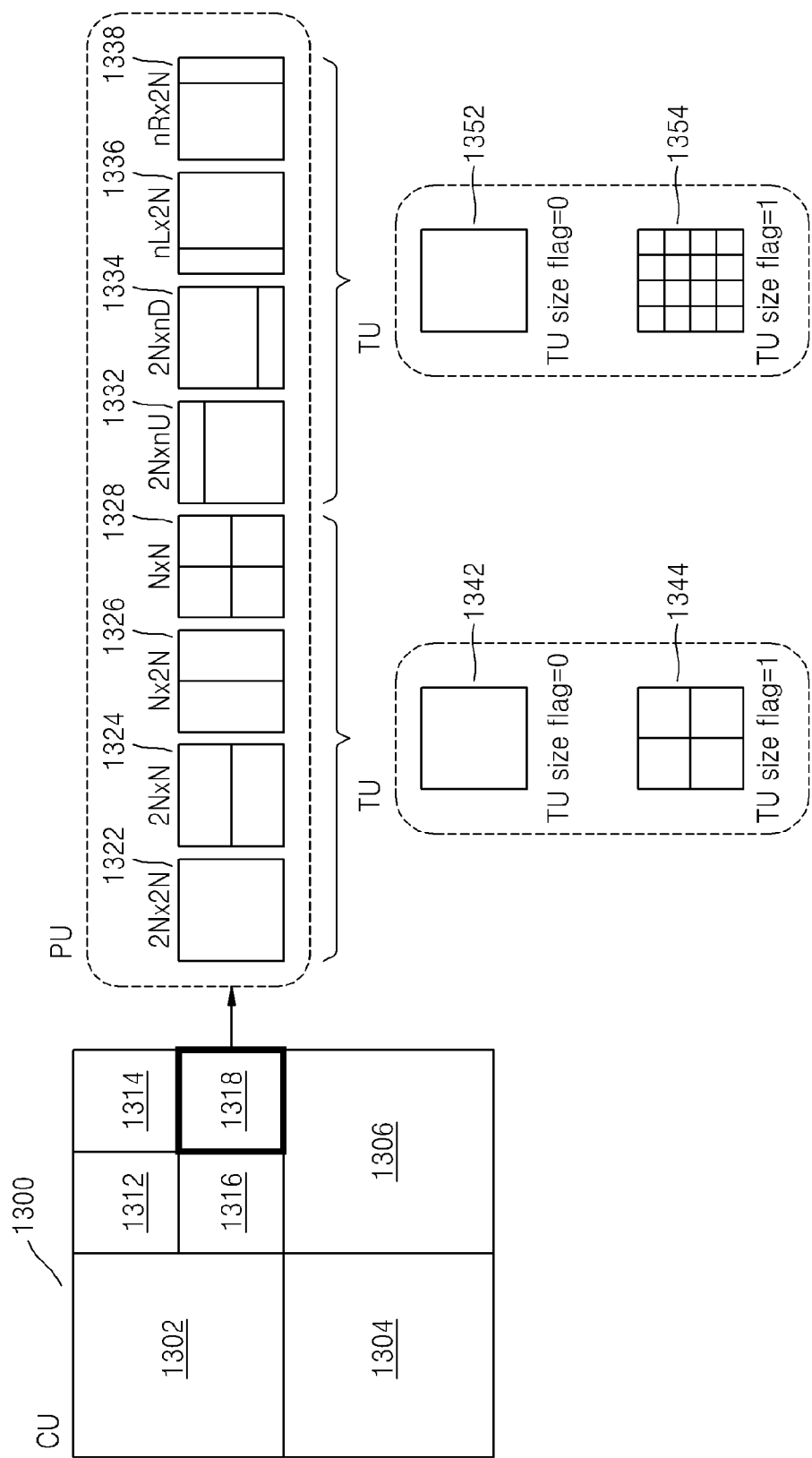
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value or 0 or 1, but the TU size flag is not limited to 1 bit, and a transformation unit may be hierarchically split having a tree structure while the TU size flag increases from 0.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, then the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize}=\max(\text{MinTransformSize},\text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize}=\min(\text{MaxTransformSize},\text{PUSize}) \quad (2)$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and is not limited thereto.

Figure 14:
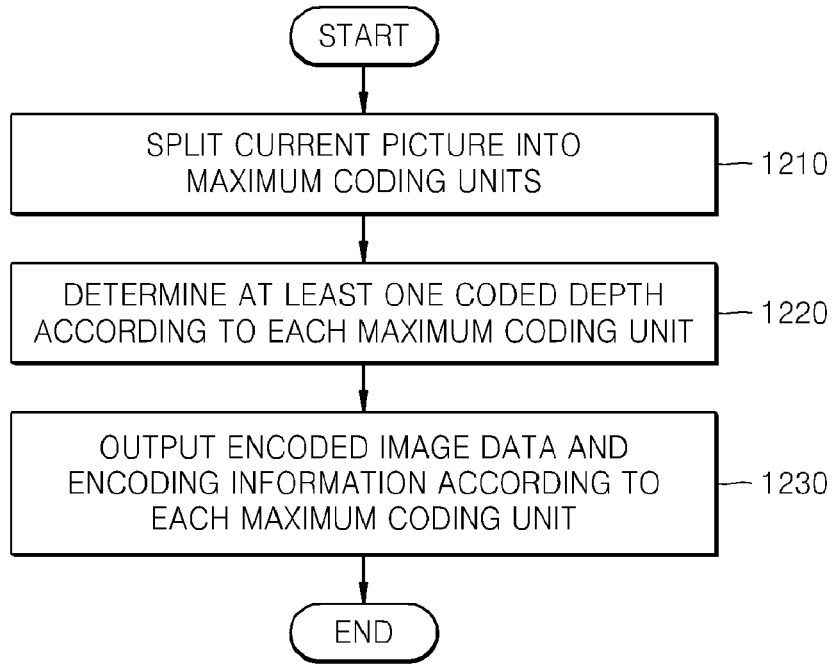
FIG. 14 is a flowchart illustrating a method of encoding a video, according to an exemplary embodiment.

FIG. 14 is a flowchart illustrating a method of encoding a video, according to an exemplary embodiment.

In operation 1210, a current picture is split into at least one maximum coding unit. A maximum depth indicating the total number of possible splitting times may be predetermined.

In operation 1220, a coded depth to output a final encoding result according to at least one split region, which is obtained by splitting a region of each maximum coding unit according to depths, is determined by encoding the at least one split region, and a coding unit according to a tree structure is determined.

The maximum coding unit is spatially split whenever the depth deepens, and thus is split into coding units of a lower depth. Each coding unit may be split into coding units of another lower depth by being spatially split independently from adjacent coding units. Encoding is repeatedly performed on each coding unit according to depths.

Also, a transformation unit according to partition types having the least encoding error is determined for each deeper coding unit. In order to determine a coded depth having a minimum encoding error in each maximum coding unit, encoding errors may be measured and compared in all deeper coding units according to depths.

In operation 1230, encoded image data constituting the final encoding result according to the coded depth is output for each maximum coding unit, with encoding information about the coded depth and an encoding mode. The information about the encoding mode may include information about a coded depth or split information, information about a partition type of a prediction unit, a prediction mode, and a size of a transformation unit. The encoded information about the encoding mode may be transmitted to a decoder with the encoded image data.

Figure 15:
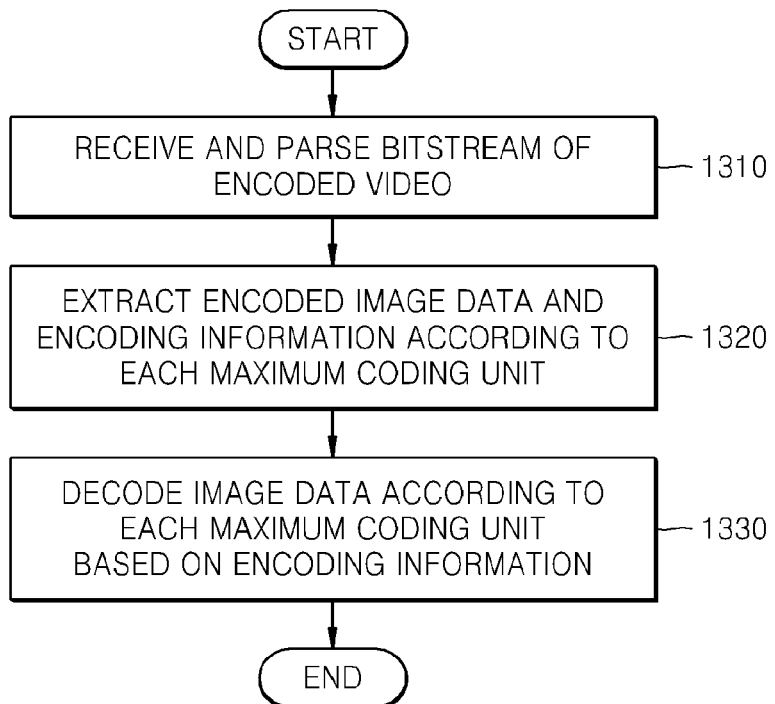
FIG. 15 is a flowchart illustrating a method of decoding a video, according to an exemplary embodiment.

FIG. 15 is a flowchart illustrating a method of decoding a video, according to an exemplary embodiment.

In operation 1310, a bitstream of an encoded video is received and parsed.

In operation 1320, encoded image data of a current picture assigned to a maximum coding unit, and information about a coded depth and an encoding mode according to maximum coding units are extracted from the parsed bitstream. The coded depth of each maximum coding unit is a depth having the least encoding error for the each maximum coding unit. In encoding each maximum coding unit, the image data is encoded based on at least one data unit obtained by hierarchically splitting the each maximum coding unit according to depths.

According to the information about the coded depth and the encoding mode, the maximum coding unit may be split into coding units having a tree structure. Each coding unit of the coding units having the tree structure is determined as a coding unit corresponding to a coded depth, optimally encoded as to output the least encoding error. Accordingly, encoding and decoding efficiency of an image may be improved by decoding each piece of encoded image data in the coding units after determining at least one coded depth according to coding units.

In operation 1330, the image data of each maximum coding unit is decoded based on the information about the coded depth and the encoding mode according to the maximum coding units. The decoded image data may be reproduced by a reproducing apparatus, stored in a storage medium, or transmitted through a network.

Encoding and decoding of a video considering an order of skip and split according to exemplary embodiments will now be explained with reference to FIGS. 16 through 23.

Figure 16:
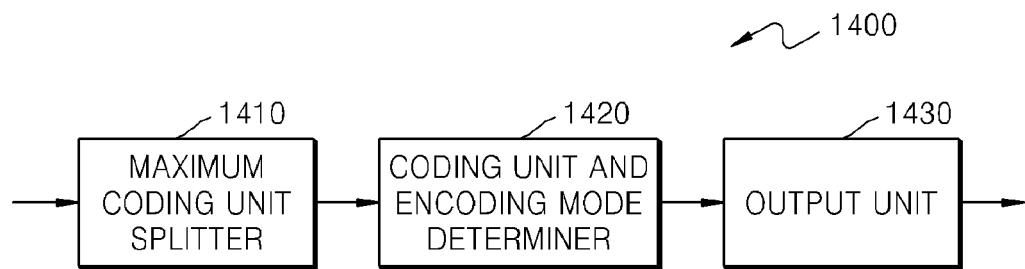
FIG. 16 is a block diagram illustrating an apparatus for encoding a video by considering a skip and split order, according to an exemplary embodiment.

FIG. 16 is a block diagram illustrating an apparatus 1400 for encoding a video by considering a skip and split order, according to an exemplary embodiment.

Referring to FIG. 16, the apparatus 1400 includes a maximum coding unit splitter 1410, a coding unit and encoding mode determiner 1420, and an output unit 1430.

The apparatus 1400 of FIG. 16 may be an example of the apparatus 100 of FIG. 1, and the maximum coding unit splitter 110, the coding unit determiner 120, and the output unit 130 of the apparatus 100 of FIG. 1 may correspond to the maximum coding unit splitter 1410, the coding unit and encoding mode determiner 1420, and the output unit 1430 of FIG. 16, respectively.

The maximum coding unit splitter 1410 splits a picture of an input image into maximum coding units having predetermined sizes, and image data according to the maximum coding units is output to the coding unit and encoding mode determiner 1420.

The coding unit and encoding mode determiner 1420 hierarchically splits regions of each of the maximum coding units input from the maximum coding unit splitter 1410 as a depth deepens, and individually performs encoding based on coding units according to depths corresponding to split numbers for every independent region hierarchically split. The coding unit and encoding mode determiner 1420 determines an encoding mode and a coded depth to output an encoding result according to each region. The encoding mode may include information about a partition type of a coding unit corresponding to the coded depth, about a prediction mode, and about a size of a transformation unit.

In order to determine an encoding mode and a coded depth to output an encoding result for every independent region of a maximum coding unit, the coding unit and encoding mode determiner 1420 may perform encoding based on coding units according to depths, and may search for a coded depth having a least encoding error in original image data and an encoding mode related to the coded depth. Accordingly, the coding unit and encoding mode determiner 1420 may determine the coding units having the tree structure by determining coding units corresponding to coded depths for each maximum coding unit of the current picture Information about the coded depth and the encoding mode determined by the coding unit and encoding mode determiner 1420 and a corresponding encoding result are output to the output unit 1430.

The output unit 1430 outputs information about a coded depth and an encoding mode according to a maximum coding unit, and encoded video data. An encoding mode includes skip mode information indicating whether a prediction mode of a coding unit is a skip mode, and split information indicating whether the coding unit is split to a lower depth. Since a prediction mode of a coding unit may be determined in a coding unit of a coded depth which is not further split, skip mode information may be encoded in the coding unit of the coded depth.

The output unit 1430 may selectively determine an order in which skip mode information and split information of coding units according to depths are output.

The output unit 1430 may output information indicating a selectively determined order in which skip mode information and split information are output. Accordingly, the output unit 1430 may output information about an order in which skip mode information and split information are output, the information about an encoding mode including the skip mode information and the split information which are arranged in the selectively determined order, and encoded video data.

The order of the skip mode information and the split information which is selectively determined for every coding unit according to depths may be determined according to at least one of an image sequence to which a coding unit corresponding to each depth belongs, a slice, a slice type according to a prediction direction, and a quantization parameter (QP) of a data unit.

Also, the order of the skip mode information and the split information which is selectively determined for every coding unit according to depths may be individually determined according to depths of coding units in a maximum coding unit.

For example, the order of the skip mode information and the split information may be determined in such a manner that the skip mode information precedes the split information for a maximum coding unit, and the split information precedes the skip mode information for coding units of lower depths other than the maximum coding unit.

The output unit 1430 may perform encoding by combining the split information and the skip mode information as one piece of split and skip information. Also, the output unit 1430 may assign different bit numbers to the split and skip information according to a frequency of occurrence of a combination of the split information and the skip mode information.

For example, if both split information indicating that a corresponding coding unit is split and skip mode information indicating that a prediction mode of the corresponding coding unit is not a skip mode are encoded, the split and skip information may be assigned one bit. Also, in cases other than the case where both the split information indicating that the corresponding coding unit is split and the skip mode information indicating that the prediction mode of the corresponding coding unit is not the skip mode are encoded, the split and skip information may be assigned two bits and output.

The output unit 1430 may not encode a transformation coefficient and prediction-related information such as a prediction direction and a motion vector, for a coding unit that is predicted in a skip mode. Selectively, the output unit 1430 may encode motion vector predictor index information about a prediction unit adjacent to a current coding unit. Also, the output unit 1430 may output information about a maximum size of the coding units.

Figure 17:
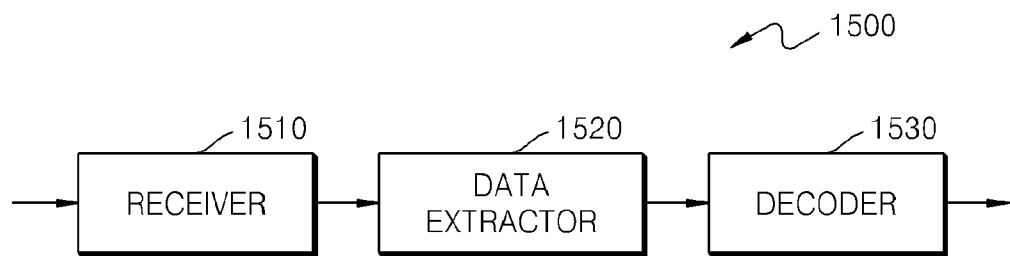
FIG. 17 is a block diagram illustrating an apparatus for decoding a video by considering a skip and split order, according to an exemplary embodiment.

FIG. 17 is a block diagram illustrating an apparatus 1500 for decoding a video by considering a skip and split order, according to an exemplary embodiment.

Referring to FIG. 17, the apparatus 1500 includes a receiver 1510, a data extractor 1520, and a decoder 1530. The apparatus 1500 of FIG. 17 may be an example of the apparatus 200 of FIG. 2. The receiver 210, the image data and encoding information extractor 220, and the image data decoder 230 of the apparatus 200 of FIG. 2 may correspond to the receiver 1510, the data extractor 1520, and the decoder 1530 of the apparatus 1500 of FIG. 17, respectively.

The receiver 1510 receives and parses a bitstream of an encoded video.

The data extractor 1520 receives the parsed bitstream from the receiver 1510, and extracts encoded video data and information about a coded depth and an encoding mode for each maximum coding unit from the bitstream. Also, the data extractor 1520 may extract information about a maximum size of the coding units from the bitstream. The data extractor 1520 extracts, from the bitstream, information about an order of skip mode information and split information of coding units according to depths.

The data extractor 1520 may read the skip mode information and the split information from the information about the encoding mode based on the extracted information about the order of the skip mode information and the split information, and extract the encoded video data in coding units according to depths based on the skip mode information and the split information.

The order of the skip mode information and the split information may be selectively set according to at least one of an image sequence to which a coding unit corresponding to each depth belongs, a slice, a slice type according to a prediction direction, and a QP of a data unit. Also, the order of the skip mode information and the split information may be selectively set according to depths of coding units according to depths in a maximum coding unit.

For example, if a coding unit is a maximum coding unit, according to the order of the skip mode information and the split information, whether the coding unit is predicted in a skip mode according to the skip mode information may be determined before determining whether the coding unit is split according to the split information. Also, if a coding unit is not a maximum coding unit, whether the coding unit is split according to the split information may be determined before determining whether the coding unit is predicted in a skip mode according to the skip mode information.

The data extractor 1520 may extract one piece of split and skip information obtained by combining the skip mode information and the split information for the coding units according to the depths. For example, if one bit of split and skip information is extracted, a corresponding coding unit may be predicted in a skip mode without being split, and if two bits of split and skip information is read, whether a corresponding coding unit is split may be determined based on the split information and whether the corresponding coding unit is predicted in a skip mode may be determined based on the skip mode information.

The data extractor 1520 may extract only the split information and the skip mode information for a coding unit that is predicted in a skip mode, and may not extract information for prediction decoding such as a transformation coefficient and prediction-related information such as a prediction direction and a motion vector. Motion vector predictor index information for a coding unit that is predicted in a skip mode may be selectively extracted. Accordingly, the decoder 1530 may perform prediction decoding on a current coding unit by borrowing motion information of a prediction unit adjacent to the current coding unit that is predicted in a skip mode, or inferring motion information of the current coding unit from motion information of the adjacent prediction unit.

The decoder 1530 decodes encoded video data according to a coding unit of at least one coded depth for every maximum coding unit of the encoded video data based on the information about the coded depth and the encoding mode.

Decoded and restored video data may be transmitted to various terminals which may reproduce the video data or may be stored in a storage device.

The apparatus 1400 of FIG. 16 and the apparatus 1500 of FIG. 17 may determine an order of skip mode information and split information by considering a data unit, an encoding mode, or the like. Also, the order of the skip mode information and the split information may be determined by considering a total bit number of the skip mode information and the split information, and a frequency of occurrence of a skip mode in encoding and decoding of video data. Since the order of the skip mode information and the split information of coding units according to depths may be set, encoded data transmission efficiency may be further improved.

Figure 18:
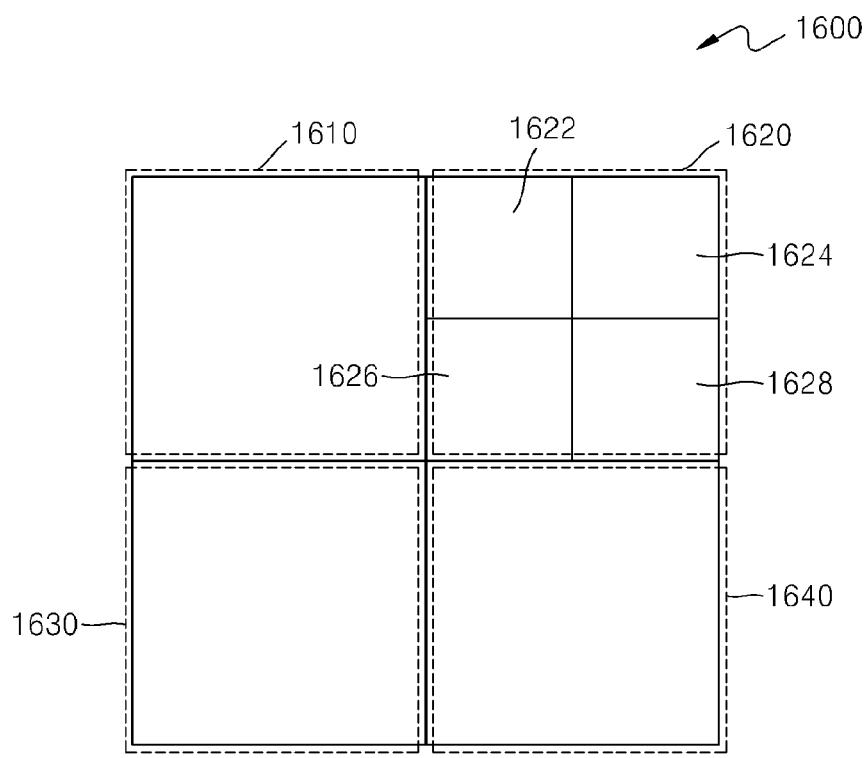
FIG. 18 illustrates coding units according to coded depths in a maximum coding unit, according to an exemplary embodiment.

FIG. 18 illustrates coding units according to coded depths in a maximum coding unit, according to an exemplary embodiment.

In order to explain an order in which the data extractor 1520 reads an encoded bitstream output from the output unit 1430 by considering an order of skip mode information and split information, a maximum coding unit 1600 is exemplary illustrated.

Coding units included in the maximum coding unit 1600 include the maximum coding unit 1600 having a depth of 0, coding units 1610, 1620, 1630, and 1640 having a depth of 1, and coding units 1622, 1624, 1626, and 1628 having a depth of 2. Also, the coding units 1610, 1630, and 1640 having the coded depth of 1 and the coding units 1622, 1624, 1626, and 1628 having the coded depth of 2 are determined as coded depths of the maximum coding unit 1600. Also, it is assumed that prediction modes of the coding units 1610, 1630, and 1640 having the depth of 1 are set to skip modes, and prediction modes of the coding units 1622, 1624, 1626, and 1628 having the depth of 2 are not set to skip modes.

An example where the data extractor 1520 of the apparatus 1500 reads split information before reading skip mode information for the maximum coding unit 1600 of a current picture will be first explained. In this example where the split information precedes the skip mode information, if the split information is 1, split information of coding units of lower depths is recursively read, and if the split information is 0, skip mode information of a coding unit of a corresponding depth is read.

Accordingly, an order in which split information and skip mode information are set or read is as follows.

Split information 1 about the maximum coding unit 1600, split information 0 and skip information 1 about the coding unit 1610 having the depth of 1, split information 0 about the coding unit 1620 having the depth of 1, split information 0 and skip information 0 about the coding unit 1622 having the depth of 2, split information 0 and the skip information 0 about the coding unit 1624 having the depth of 2, split information 0 and skip information 0 about the coding unit 1626 having the depth of 2, split information 0 and skip information 0 about the coding unit 1628 having the depth of 2, split information 0 and skip information 1 about the coding unit 1630 having the depth of 1, and split information 0 and skip information 1 about the coding unit 1640 having the depth of 1 may be sequentially read. Accordingly, a total bit number of the split information and the skip mode information of the maximum coding unit 1600 is 16.

Also, another example where the data extractor 1520 of the apparatus 1400 reads skip mode information of the maximum coding unit 1600 of a current picture earlier than split information will be explained. In this example where the skip mode information precedes the split information, if the skip mode information is 1, split information of coding units having lower depths do not need to be set, and if the skip mode information is 0, the split information is set. Accordingly, an order in which the split information and the skip mode information are set or read is as follows.

Skip mode information 0 about the maximum coding unit 1600, skip mode information 1 about the coding unit 1610 having the depth of 1, skip mode information 0 and split information 1 about the coding unit 1620 having the depth of 1, skip mode information 0 and split information 0 about the coding unit 1622 having the depth of 2, skip mode information 0 and split information 0 about the coding unit 1624 having the depth of 2, skip mode information 0 and split information 0 about the coding unit 1626 having the depth of 2, skip mode information 0 and split information 0 about the coding unit 1628 having the depth of 2, skip mode information 1 about the coding unit 1630 having the depth of 1, and skip mode information 1 about the coding unit 1640 having the depth of 1 may be sequentially read. In this case, a total bit number of the split information and the skip mode information about the maximum coding unit 1600 is 14.

Figure 19:
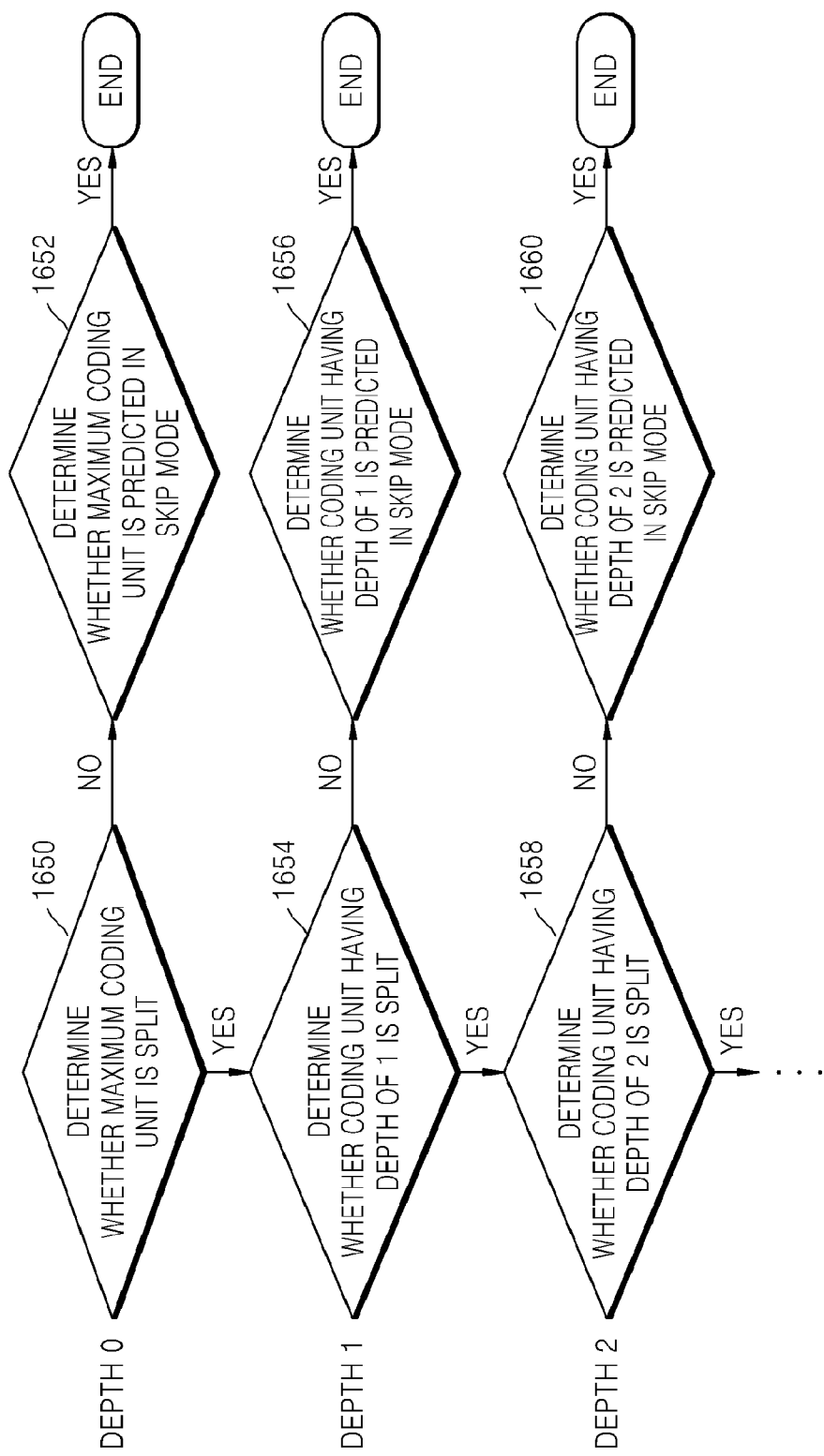
FIGS. 19 through 21 are flowcharts illustrating methods of encoding and decoding skip information and split information, according to various exemplary embodiments.
Figure 20:
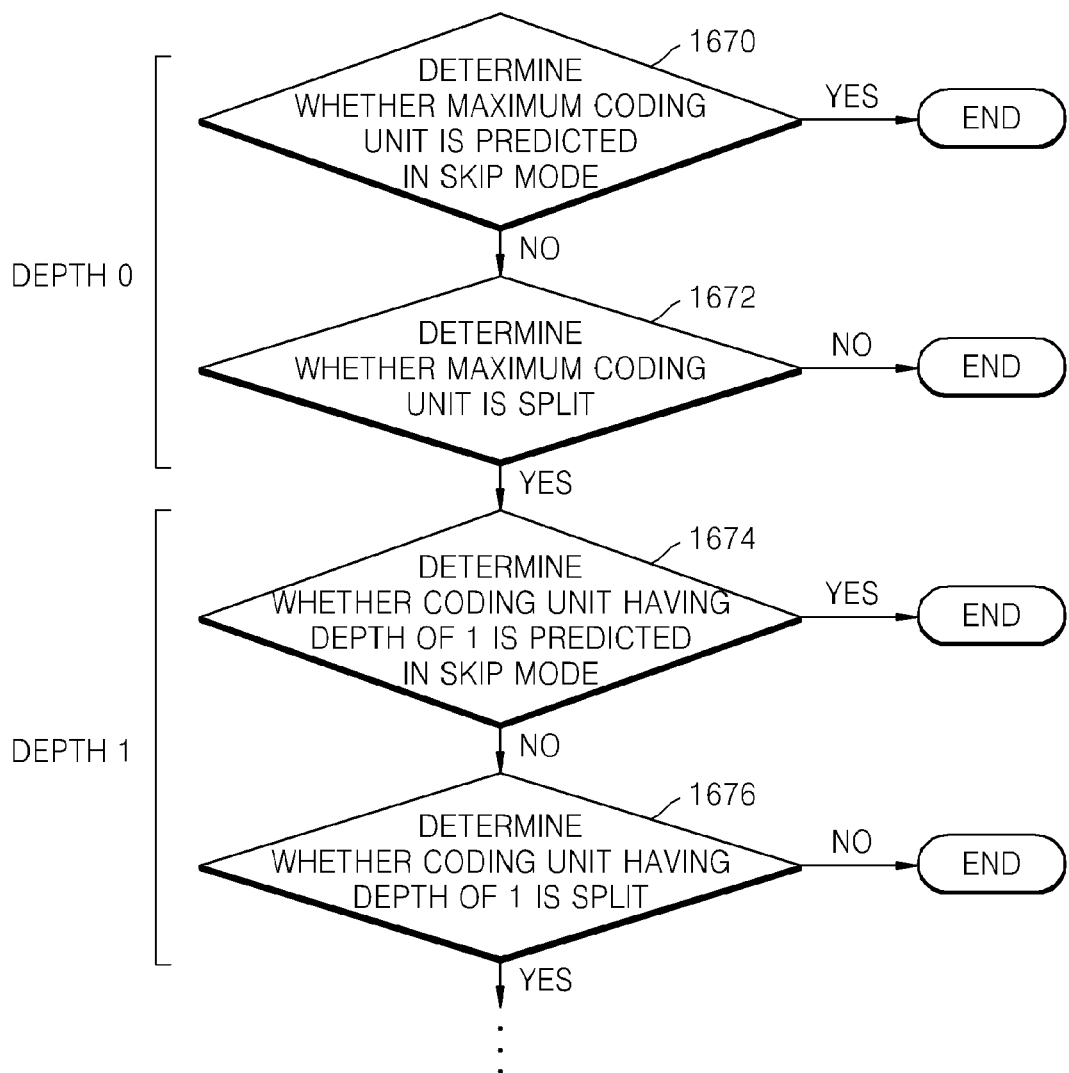
Figure 21:
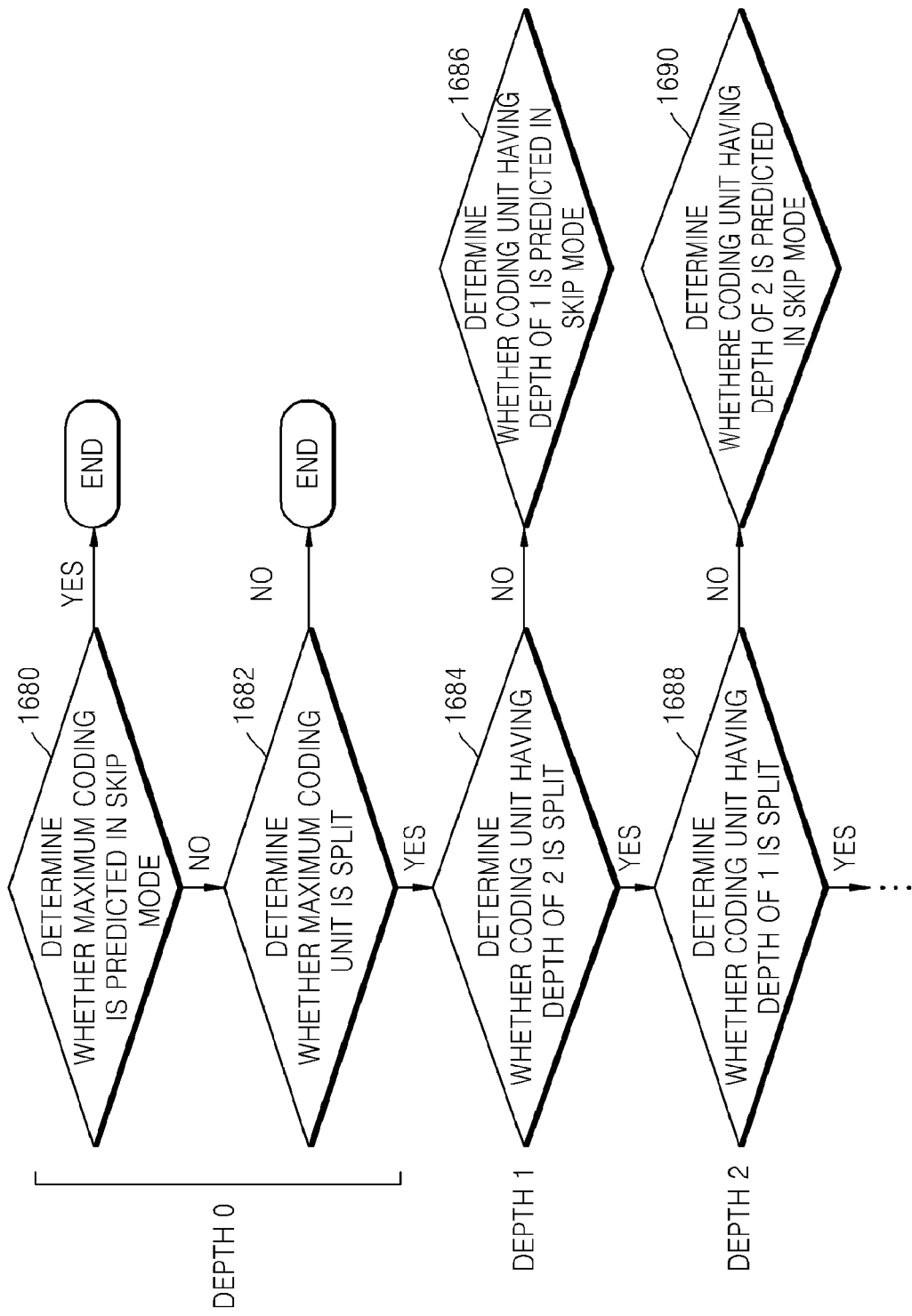

FIGS. 19 through 21 are flowcharts illustrating methods of encoding and decoding skip information and split information, according to various exemplary embodiments.

If the output unit 1430 of the apparatus 1400 outputs an encoded bitstream in such a manner that split information precedes skip mode information according to a split first method, the data extractor 1520 of the apparatus 1500 reads encoded video data according to an order in which the skip mode information and the split information are read.

That is, in operation 1650, according to the split first method, the data extractor 1520 reads split information about a maximum coding unit having a depth of 0 and determines whether the maximum coding unit is split. If it is determined in operation 1650 that the maximum coding unit is not split, the method proceeds to operation 1652. In operation 1652, skip mode information is read and it is determined whether the maximum coding unit is predicted in a skip mode. If it is determined in operation 1650 that the maximum coding unit is split, the method proceeds to operation 1654. In operation 1654, split information of a coding unit having a depth of 1 is read. Similarly, in operation 1654, it is determined whether the coding unit having the depth of 1 is split. If it is determined in operation 1654 that the coding unit having the depth of 1 is not split according to split information of the coding unit having the depth of 1, the method proceeds to operation 1656. In operation 1656, skip mode information of the coding unit having the depth of 1 is read. If it is determined in operation 1654 that the coding unit having the depth of 1 is split, the method proceeds to operation 1658. In operation 1658, split information of a coding unit having a depth of 2 is read and it is determined whether the coding unit having the depth of 2 is split. If it is determined in operation 1658 that the coding unit having the depth of 2 is not split, the method proceeds to operation 1660. In operation 1660, skip mode information of the coding unit having the depth of 2 is read. If it is determined in operation 1658 that the coding unit having the depth of 2 is split, the method may proceed to a next depth.

If the output unit 1430 of the apparatus 1400 outputs an encoded bitstream in such a manner that skip mode information precedes split information according to a skip first method, the data extractor 1520 of the apparatus 1500 reads encoded video data according to an order in which the skip mode information and the split information are read.

That is, in operation 1670, according to the skip first method, the data extractor 1520 reads skip mode information about a maximum coding unit having a depth of 0. If it is determined from the reading that a prediction mode of the maximum coding unit is a skip mode, the decoder 1530 may decode the maximum coding unit in a skip mode. In operation 1670, if it is determined from the reading that the prediction mode of the maximum coding unit is not a skip mode, the method may proceed to operation 1672. In operation 1672, the data extractor 1520 may read split information of the maximum coding unit having the depth of 0. In operation 1672, if it is determined from the reading that the maximum coding unit is not split, the decoder 1530 may decode the maximum coding unit. In operation 1672, if it is determined from the reading that the maximum coding unit is split, the method proceeds to operation 1674. In operation 1674, the data extractor 1520 may read skip mode information of a coding unit having a depth of 1.

Similarly, in operation 1674, according to the skip mode information of the coding unit having the depth of 1, if it is determined from the reading that a prediction mode of the coding unit having the depth of 1 is a skip mode, the coding unit having the depth of 1 may be decoded in a skip mode. If it is determined from the reading in operation 1674 that a prediction mode of the coding unit having the depth of 1 is not a skip mode, the method proceeds to operation 1676. In operation 1676, split information of the coding unit having the depth of 1 may be read.

If the output unit 1430 of the apparatus 1400 performs encoding in such a manner that skip mode information precedes split information for a maximum coding unit and split information precedes skip mode information for coding units other than the maximum coding unit, the data extractor 1520 of the apparatus 1500 reads encoded video data according to an order in which the skip mode information and the split information are read.

That is, in operation 1680, according to a skip first method for a maximum coding unit having a depth of 0, the data extractor 1520 reads skip mode information about the maximum coding unit having the depth of 0. If it is determined from the reading that a prediction mode of the maximum coding unit is a skip mode, the decoder 1530 may decode the maximum coding unit in a skip mode. In operation 1680, if it is determined from the reading that the prediction mode of the maximum coding unit is not a skip mode, the method proceeds to operation 1682. In operation 1682, the data extractor 1520 may read split information of the maximum coding unit having the depth of 0. In operation 1682, if it is determined from the reading that the maximum coding unit is not split, the decoder 1530 may decode the maximum coding unit. In operation 1682, if it is determined from the reading that the maximum coding unit is split, the data extractor 1520 may read split information and skip mode information of a coding unit having a depth of 1 in operations 1684 and 1686.

In operation 1684, according to a split first method for the coding unit having the depth of 1, if it is determined from the reading that the coding unit having the depth of 1 is not split according to split information of the coding unit having the depth of 1, the method proceeds to operation 1686. In operation 1686, skip mode information of the coding unit having the depth of 1 is read. In operation 1684, if it is determined from the reading that the coding unit having the depth of 1 is split, the method proceeds to operation 1688, and split information of a coding unit having a depth of 2 may be read. In operation 1688, if the coding unit having the depth of 2 is not split according to the split information of the coding unit having the depth of 2, the method proceeds to operation 1690. In operation 1690, skip mode information of the coding unit having the depth of 2 may be read, and if the coding unit having the depth of 2 is split, the method may proceed to a next depth.

Total bit numbers of skip mode information and split information according to the exemplar embodiments of FIGS. 19 through 21 will be compared with one another as follows.

In detail, if a maximum coding unit is encoded in a skip mode, total bit numbers of skip mode information and split information according to various exemplary embodiments are as shown in Table 2.

TABLE 2

| Embodiment | Skip mode information and split information | Total bit number |
|---|---|---|
| Split first method (FIG. 19) | Split information 0, skip mode information 1 | 2 bits |
| Skip first method (FIG. 20) | Skip mode information 1 | 1 bit |
| Maximum coding unit skip first method (FIG. 21) | Skip mode information 1 | 1 bit |

According to a split first method of Table 2, since split information of a maximum coding unit having a depth of 0 is encoded to be '0' and skip mode information of the maximum coding unit having the depth of 0 is encoded to be '1', the data extractor 1520 may read two bits of skip mode information and split information in total. According to a skip first method of Table 2, since skip mode information of the maximum coding unit having the depth of 0 is encoded to be '1', the data extractor 1520 may read one bit of skip mode information in total. According to a maximum coding unit skip first method of Table 2, since skip mode information of the maximum coding unit having the depth of 0 is encoded to be '1', the data extractor 1520 may read only one bit of skip mode information in total.

In detail, if a coding unit having a depth of 2 is encoded in a skip mode, total bit numbers of skip mode information and split information according to various exemplary embodiments are as shown in Table 3.

TABLE 3

| Embodiment | Skip mode information and split information | Total bit number |
|---|---|---|
| Split first method (FIG. 19) | Split information 1, split information 1, split information 0, skip mode information 1 | 4 bits |
| Skip first method (FIG. 20) | Skip mode information 0, split information 1, skip mode information 0, split information 1, skip mode information 1 | 5 bits |
| Maximum coding unit skip first method (FIG. 21) | Skip mode information 0, split information 1, split information 1, split information 0, skip mode information 1 | 5 bits |

According to a split first method of Table 3, since split information of a maximum coding unit having a depth of 0 is encoded to be '1', split information of a coding unit having a depth of 1 is encoded to be '1', split information of a coding unit having a depth of 2 is encoded to be '0', and skip mode information of the coding unit having the depth of 2 is encoded to be '1', the data extractor 1520 may read four bits of skip mode information and split information in total. According to a skip first method of Table 3, since skip mode information of the maximum coding unit having the depth of 0 is encoded to be '0', split information of the maximum coding unit having the depth of 0 is encoded to be '1', skip mode information of the coding unit having the depth of 1 is encoded to be '0', split information of the coding unit having the depth of 1 is encoded to be '1', and skip mode information of the coding unit having the depth of 2 is encoded to be '1', the data extractor 1520 may read five bits of skip mode information and split information in total. According to a maximum coding unit skip first method of Table 3, since skip mode information of the maximum coding unit having the depth of 0 is encoded to be '0', split information of the maximum coding unit having the depth of 0 is encoded to be '1', split information of the coding unit having the depth of 1 is encoded to be '1', split information of the coding unit having the depth of 2 is encoded to be '0', and skip mode information of the coding unit having the depth of 2 is encoded to be '1', the data extractor 1520 may read five bits of skip mode information and split information in total.

As described above with reference to FIGS. 19 through 21, by changing an order of split information and skip mode information, a total bit number of skip mode information about coding units according to depths may be varied. For example, if a coding unit of an upper depth is predicted and encoded in a skip mode, since split information of a coding unit of a lower depth does not need to be encoded, if there are many regions predicted and encoded in a skip mode, it may be advantageous in terms of a bit rate that skip mode information precedes split information. However, in an image with a small number of skip modes, it may be advantageous in terms of a bit rate that split information precedes skip mode information.

Accordingly, a bit rate may be adjusted by adjusting an order of split information and skip mode information according to characteristics of an image, a sequence, a data unit level such as a slice, a QP, and a slice type. Also, like in the example explained with reference to FIG. 21 where a skip first method is selected only for a maximum coding unit and a split first method is selected for coding units having depths other than the maximum coding unit, an order of split information and skip mode information may be changed according to depths.

In the exemplary embodiment described with reference to FIG. 18, skip mode information or split information is earlier read in units of pictures. The apparatus 1400 of FIG. 16 and the apparatus 1500 of FIG. 17 may variably determine an order in which skip mode information and split information are output or read according to a data unit, a depth, a QP, and a slice type according to a prediction direction without being limited to the exemplary embodiment of FIG. 18.

Also, split information and skip mode information may be combined and used as one piece of split and skip information. The apparatus 1400 of FIG. 16 and the apparatus 1500 of FIG. 17 may use split and skip information that is assigned 1 bit for a combination of split information and skip mode information having a high frequency of occurrence, and split and skip information that is assigned 2 bits for a combination having a low frequency of occurrence.

If split information precedes skip mode information, since split information of a coding unit of a lower depth is immediately read when split information of a coding unit of a current depth is 1, a skip mode of a current coding unit is not read. Accordingly, three combinations, that is, split information 1, a combination of split information 0 and skip mode information 0, and a combination of split information 0 and skip mode information 1, may occur. For example, a frequency of occurrence of the combination of split information 0 and skip mode information 1 is the highest, the combination is assigned 1 bit, and each of the split information 1 and the combination of split information 0 and skip mode information 0 may be assigned 2 bits.

Figure 22:
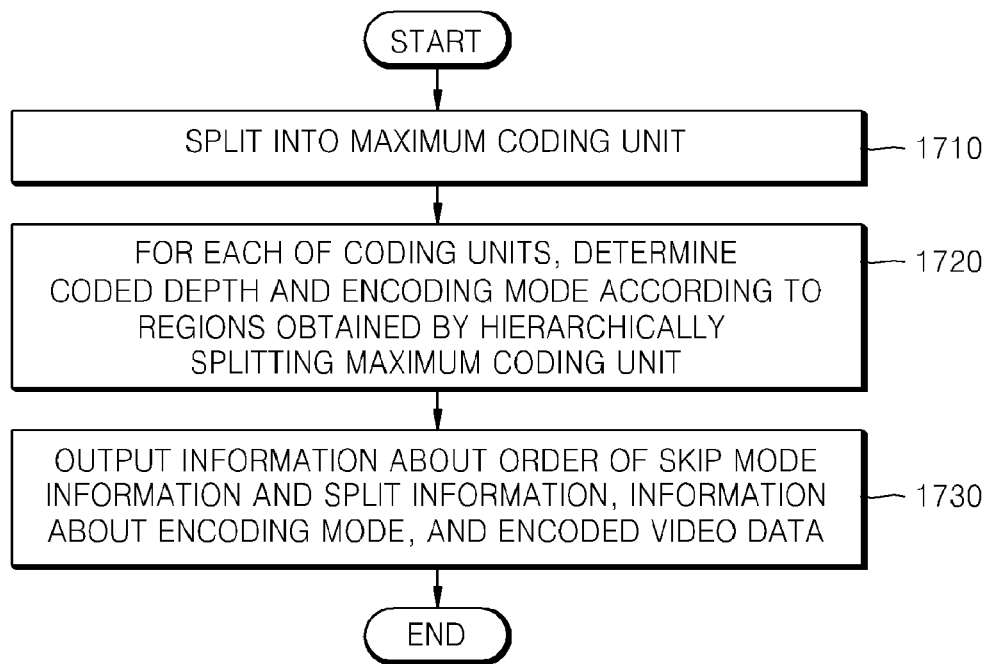
FIG. 22 is a flowchart illustrating a method of encoding a video by considering a skip and split order, according to an exemplary embodiment.

FIG. 22 is a flowchart illustrating a method of encoding a video by considering a skip and split order, according to an exemplary embodiment.

In operation 1710, a picture is split into maximum coding units having predetermined maximum sizes.

In operation 1720, for each of coding units having a tree structure, an encoding mode about a coded depth to output an encoding result and a coding unit of the coded depth is determined by performing encoding based on coding units according to depths, according to regions obtained by hierarchically splitting the maximum coding unit as a depth deepens.

In operation 1730, information indicating an order of skip mode information and split information which is selectively determined for every coding unit according to depths, information about the encoding mode including the skip mode information and the split information which are arranged according to the determined order, and encoded video data are output for every maximum coding unit.

Also, one piece of combined split and skip information obtained by combining the split information and the skip mode information may be set. Also, a bit number of the corresponding split and skip information may be assigned based on a frequency of occurrence of a combination of the split information and the skip mode information.

Figure 23:
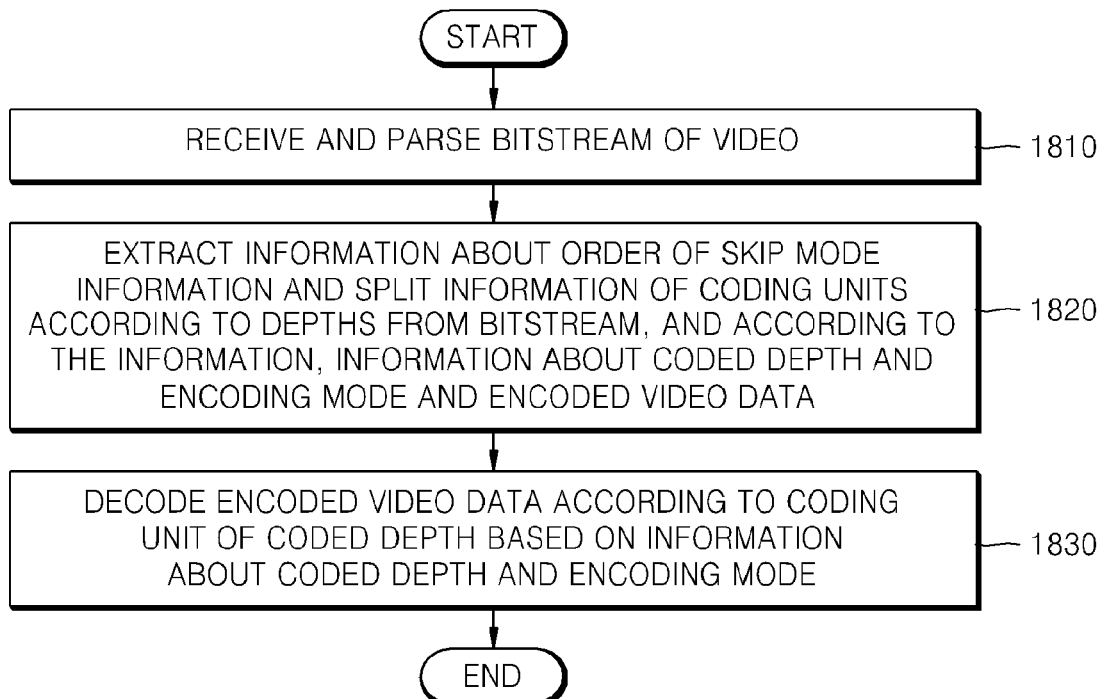
FIG. 23 is a flowchart illustrating a method of decoding a video by considering a skip and split order, according to an exemplary embodiment.

FIG. 23 is a flowchart illustrating a method of decoding a video by considering a skip and split order, according to an exemplary embodiment.

In operation 1810, a bitstream of an encoded video is received and parsed.

In operation 1820, information about an order of skip mode information and split information of coding units according to depths is extracted from the bitstream, and according to the order of the skip mode information and the split information, information about a coded depth and an encoding mode and encoded video data are extracted according to a maximum coding unit from the bitstream.

Also, one piece of combined split and skip information obtained by combining the split information and the skip mode information may be read. The method of decoding the video of FIG. 23 may read a combination of the split information and the skip mode information based on the split and skip information that is discriminatively assigned based on a frequency of occurrence of a combination of the split information and the skip mode information.

In operation 1830, encoded video data is decoded according to coding units having a tree structure for every maximum coding unit of encoded video data based on the information about the coded depth and the encoding mode.

Exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Moreover, one or more units of the apparatus 1400 and the apparatus 1500 can include a processor or microprocessor executing a computer program stored in a computer-readable medium, such as the local storage 220

While exemplary embodiments have been particularly shown and described above, it will be understood by those of ordinary skill in the art that various changes in form and details may be made therein without departing from the spirit and scope of the inventive concept as defined by the appended claims. The exemplary embodiments should be considered in a descriptive sense only and not for purposes of limitation. Therefore, the scope of the inventive concept is defined not by the detailed description of exemplary embodiments but by the appended claims, and all differences within the scope will be construed as being included in the present invention.

What is claimed is:

1. A video decoding apparatus comprising:
a receiver which receives a bitstream of encoded video;
an extractor which extracts, from the bitstream, split information of a coding unit in a maximum coding unit of a picture; and
a decoder which, when the split information indicates a split for a current depth, splits a coding unit of the current depth, independently from neighboring coding units, into coding units of a lower depth, and
when the split information indicates a non-split for the current depth, determines at least one partition from the coding unit of the current depth and decodes the coding unit of the current depth by performing a prediction based on the at least one partition,
wherein, when skip information for the coding unit of the current depth indicates a skip mode, the coding unit of the current depth is decoded by performing a prediction in the skip mode based on a partition having a size equal to a size of the coding unit of the current depth; and
when the skip information for the coding unit of the current depth does not indicate the skip mode, the coding unit of the current depth is decoded by performing a prediction in a prediction mode indicated by prediction mode information obtained from the bitstream,
wherein the picture is split into a plurality of maximum coding units according to information about the maximum size of the coding unit obtained from the bitstream.

2. A method of encoding a video, the method comprising:
generating split information of a coding unit of a current depth in a maximum coding unit of a picture;
when the coding unit of a current depth is not split into coding units of a lower depth, generating skip information of the coding unit of a current depth; and
when prediction is performed on the coding unit of the current depth not in the skip mode, generating information about a prediction mode indicating one of an intra mode and an inter mode,
wherein:
when the coding unit of a current depth is split into the coding units of a lower depth, the coding unit of the current depth is split independently from neighboring coding units, into the coding units of a lower depth, and
when for the coding unit of the current depth is not split into the coding units of a lower depth, at least one partition is determined from the coding unit of the current depth and a prediction is performed on the coding unit of the current depth based on the at least one partition,
wherein, prediction is performed on the coding unit of a current depth in a skip mode, a prediction is performed in the skip mode based on a partition having a size equal to a size of the coding unit of the current depth, and
when prediction is performed on the coding unit of the current depth not in the skip mode, a prediction is performed in the prediction mode which is one of an intra mode and an inter mode.

3. An apparatus for encoding a video, the apparatus comprising at least one processor configured to:
generate split information of a coding unit of a current depth in a maximum coding unit of a picture,
when the coding unit of a current depth is not split into coding units of a lower depth, generate skip information of the coding unit of a current depth, and
when prediction is performed on the coding unit of the current depth not in the skip mode, generate information about a prediction mode indicating one of an intra mode and an inter mode,
wherein:
when the coding unit of a current depth is split into the coding units of a lower depth, the at least one processor is configured to split the coding unit of the current depth independently from neighboring coding units, into the coding units of a lower depth, and
when for the coding unit of the current depth is not split into the coding units of a lower depth, the at least one processor is configured to determine at least one partition from the coding unit of the current depth and performed a prediction on the coding unit of the current depth based on the at least one partition,
wherein, prediction is performed on the coding unit of a current depth in a skip mode, the at least one processor is configured to perform a prediction in the skip mode based on a partition having a size equal to a size of the coding unit of the current depth, and
when prediction is performed on the coding unit of the current depth not in the skip mode, the at least one processor is configured to perform a prediction in the prediction mode which is one of an intra mode and an inter mode.

* * * * *